US012779994B2

(12) United States Patent
Jang et al.

(10) Patent No.: US 12,779,994 B2
(45) Date of Patent: Nov. 3, 2026

(54) DISPLAY DEVICE AND VEHICLE EQUIPPED WITH THE DISPLAY DEVICE

(71) Applicant: HYUNDAI MOBIS CO., LTD., Seoul (KR)

(72) Inventors: Kil Pyung Jang, Seoul (KR); Shin Yeong Kim, Cheongju-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/779,697

(22) Filed: Jul. 22, 2024

(65) Prior Publication Data

US 2025/0170892 A1 May 29, 2025

(30) Foreign Application Priority Data

Nov. 28, 2023 (KR) ........................ 10-2023-0167484

(51) Int. Cl.

| | |
|---|---|
| ***B60K 35/22*** | (2024.01) |
| ***B60K 35/53*** | (2024.01) |
| ***B60Q 3/16*** | (2017.01) |
| ***B60Q 11/00*** | (2006.01) |

(52) U.S. Cl.

CPC ............ *B60K 35/223* (2024.01); *B60K 35/53* (2024.01); *B60Q 3/16* (2017.02); *B60Q 11/005* (2013.01)

(58) Field of Classification Search

CPC .. B60Q 11/005; B60Q 3/16; B60K 2360/178; B60K 35/00; B60K 35/10; B60K 35/22; B60K 35/223; B60K 35/28; B60K 35/29; B60K 35/53; B60K 35/60; B60K 35/81; B60K 35/90

See application file for complete search history.

(56) References Cited

U.S. PATENT DOCUMENTS 6,811,129 B2 * 11/2004 Kimura .................. B60R 11/02 248/221.11
12,456,395 B2 * 10/2025 Jang ........................ G09F 9/301
2002/0088933 A1 * 7/2002 Yu ........................ G01D 5/3473 250/231.13

(Continued)

FOREIGN PATENT DOCUMENTS

| | | |
|---|---|---|
| EP | 1637387 A1 | 3/2006 |
| WO | 2021/073798 A1 | 4/2021 |

OTHER PUBLICATIONS

Office Action dated Oct. 29, 2025 issued in the corresponding European Patent Application No. 24189134.0.

*Primary Examiner* — Peter D Le

(74) *Attorney, Agent, or Firm* — MORGAN, LEWIS & BOCKIUS LLP

(57) ABSTRACT

The present disclosure relates a display device and a vehicle equipped with the display device. The display device may include a display driver configured for moving a display, a display winder operatively engaged to the display driver and configured for winding and unwinding the display according to the movement of the display, and a display support unit supporting the display. The display support unit may include a housing having an opening formed therein to allow the display to be retracted and extended, a supporter having a top end hinged to a top end portion of the display and supporting the display, and a supporter fixture fixing the supporter.

15 Claims, 20 Drawing Sheets

(56) References Cited

U.S. PATENT DOCUMENTS

| | | | | |
|---|---|---|---|---|
| 2008/0298428 | A1* | 12/2008 | Twerdochlib | G01J 5/07 374/121 |
| 2012/0071828 | A1* | 3/2012 | Tojo | A61J 1/2096 604/131 |
| 2015/0014380 | A1* | 1/2015 | Oyama | B62J 50/22 224/413 |
| 2016/0132281 | A1* | 5/2016 | Yamazaki | G06F 1/1643 345/1.3 |
| 2017/0349098 | A1 | 12/2017 | Uhm | |
| 2021/0029431 | A1* | 1/2021 | Kim | H04R 5/02 |
| 2022/0141976 | A1 | 5/2022 | Yang et al. | |
| 2023/0393455 | A1* | 12/2023 | Harmon | B60R 11/0235 |
| 2024/0149681 | A1* | 5/2024 | Ive | B60K 35/50 |
| 2025/0162503 | A1* | 5/2025 | Scott-Collins | H04N 23/50 |

* cited by examiner (a)

(b)

DISPLAY DEVICE AND VEHICLE EQUIPPED WITH THE DISPLAY DEVICE

CROSS-REFERENCE TO RELATED APPLICATION(S)

This application is based on and claims priority under 35 U.S.C. § 119 to Korean Patent Application No. 10-2023-0118372, which was filed in the Korean Intellectual Property Office on Sep. 6, 2023, the entire disclosure of which is incorporated herein by reference.

BACKGROUND

1. Field

The present embodiments relate to a flexible display device for a vehicle, which is applicable to vehicles in all fields, a method of controlling the display device, and a vehicle equipped with the display device, and more particularly, to an apparatus and method for supporting a device capable of retracting or extending (retracting/extending) a flexible display which is bendable or warpable.

2. Description of Related Art

A center fascia display of a vehicle may display various visual information about the vehicle. Such a display device may also be installed on a dashboard of a vehicle disposed in front of a driver's seat and a front passenger seat, and provides various convenience information such as navigation, vehicle management and operation, Internet, and entertainment.

In this regard, there is a movable display device, and the movable display device is capable of moving up and down or left and right relative to a dashboard. As the display moves along a guide, a driver and a passenger may selectively use the display. In the case of a display in the form of a pop-up, the display may be stored and then extended and used when necessary.

Since an installation position of a fixed display is fixed, the use of space in a vehicle is limited, and as a display size increases, the forward visibility decreases. A pop-up style movable display requires a separate accommodation space for the display, and as the size of the display increases, the size of the accommodation space also increases, limiting the utilization of space in the vehicle. In addition, since an entire screen is operated in an LCD screen display, inefficiency in that all power is used regardless of a degree of exposure of the display remains.

Therefore, it is required to develop a display device having a form and structure for multiplying advantages while minimizing these disadvantages.

SUMMARY

An object of the embodiments of the disclosure is to provide a display device for reducing the size of an accommodation space of a display used in a vehicle.

An object of the disclosure is to provide a display device for efficiently retracting or extending a display used in a vehicle from an accommodation space.

An object of embodiments of the disclosure is to provide a display device for controlling a degree of exposure of a display according to a purpose of using a display.

In addition, an object of embodiments of the disclosure is to provide a display device for saving power for outputting a display image.

It will be appreciated by one of ordinary skill in the art that the objects that could be achieved with the disclosure are not limited to what has been particularly described hereinabove and the above and other objects that the disclosure could achieve will be more clearly understood from the following detailed description.

To achieve the above objects, a display device according to embodiments may include a display driver configured for moving a display, a display winder operatively engaged to the display driver and configured for winding and unwinding the display according to the movement of the display, and a display support unit supporting the display. The display support unit may include a housing having an opening formed therein to allow the display to be retracted and extended, a supporter having a top end hinged to a top end portion of the display and supporting the display, and a supporter fixture fixing the supporter.

According to embodiments, the supporter fixture may include a movable plate hinged to a bottom end of the supporter and sliding together with the supporter, a lock plate located under the movable plate, a second motor configured for providing a driving force, a shaft engaged to the second motor for receiving the driving force and being a rotation axis, and a cam fixed to the shaft, receiving the driving force, and rotatable by the driving force. The lock plate is movable upward and downward by rotation of the cam.

According to embodiments, the supporter fixture may further include a sensed portion fixed to one side of the shaft to rotate together with the shaft, and having a rotation axis identical to the rotation axis of the shaft, and a sensor including a light emitter emitting light and a light receiver receiving the light. The sensed portion may include a single hole, and on/off of the sensor may be determined according to whether the light is blocked by the sensed portion.

According to embodiments, the cam may have a rotation axis identical to the rotation axis of the shaft. The cam may include a first surface formed in a straight line and a second surface formed in a curve with a decreasing curvature, and the rotation axis of the cam may be formed at a position where the first surface and the second surface meet.

According to embodiments, the movable plate may include a block member on a bottom end portion of the movable plate, and the lock plate may include at least one concave groove at a top end portion thereof to accommodate the block member.

According to embodiments, the supporter fixture may further include a first stopper preventing sliding of the movable plate beyond an operating range of the movable plate, and a second stopper preventing upward and downward movements of the lock plate beyond an operating range of the lock plate.

According to embodiments, the supporter fixture may further include a spring providing an elastic force in a movement direction of the lock plate.

According to embodiments, the display driver may include a first motor configured for providing a driving force, a worm gear unit connected to the first motor and having a rotation axis parallel to the first motor, and a worm wheel unit connected to the worm gear unit and having a rotation axis perpendicular to the first motor. The display winder may include a cylindrical rotation drum rotating around a horizontal rotation axis and capable of winding the display around an outer circumferential surface thereof, and the rotation axis of the worm wheel unit may be identical to the rotation axis of the rotation drum to move the display by rotation of the first motor.

To achieve the above objects, a vehicle according to embodiments may include a vehicle body and a display device provided in the vehicle body. The display device may include a display driver configured for moving a display, a display winder operatively engaged to the display driver and configured for winding and unwinding the display according to the movement of the display; and a display support unit supporting the display. The display support unit may include a housing having an opening formed therein to allow the display to be retracted and extended, a supporter having a top end hinged to a top end portion of the display and supporting the display, and a supporter fixture fixing the supporter.

According to embodiments, the housing may be an instrument panel (IP) of the vehicle body.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
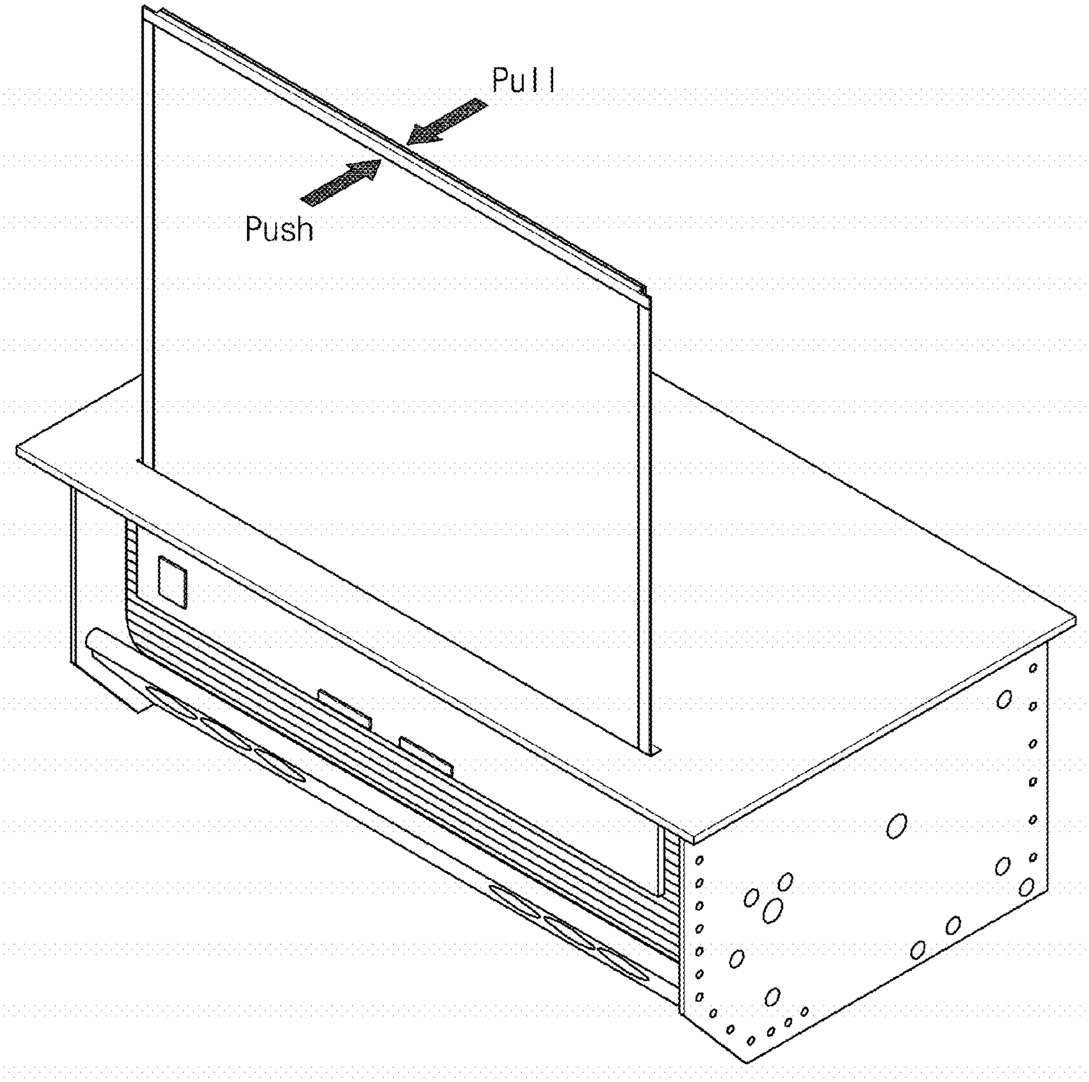
FIG. 1 illustrates a conventional display device.

Embodiments of the disclosure will be described below in detail with reference to the attached drawings. Like reference numerals denote the same components throughout the drawings regardless of drawing numbers, and a redundant description of the components will be avoided.

The term "module" and "unit" used to name a component are given or used interchangeably in consideration of only the ease of description, and do not have meanings or roles that are distinguished from each other. Lest it should obscure the subject matter of the disclosure, a detailed description of a generally known function or structure of the disclosure will be avoided.

The attached drawings are provided only to help the understanding of the embodiments of the disclosure, not intended to limit the technical features set forth herein, and it should be appreciated that the disclosure encompasses all changes, equivalents, or replacements within the scope and spirit of the disclosure.

Ordinal numbers such as $1^{st}$, $2^{nd}$ first, and second may be used to describe various elements, but the elements are not limited by the terms. The above terms are used only for the purpose of distinguishing one component from another component.

When it is said that a component is "connected" or "coupled" to another component, this may mean that the component is directly connected or coupled to the other component, but a third component may exist in the middle. On the other hand, when it is said that a component is "directly connected" or "directly coupled" to another component, this may mean that there is no other component between the two components.

Unless otherwise dictated contextually, a singular expression includes plural referents.

The term "include" or "have" as used herein is intended to designate the presence of a feature, a number, a step, an operation, a component, a part, or a combination thereof, not excluding the possibility of the presence or addition of one or more other features, numbers, steps, operations, components, parts, or combinations thereof.

FIG. 1 illustrates a conventional display device.

As illustrated in FIG. 1, rollable/slidable display devices currently being developed by various competitors suffer from smaller rigidity than fixed display devices in view of their designs or mounting structures.

Particularly, when a force such as a push load or pull load is applied to a display which has been fully extended, the display is vulnerable to breakage because a support structure for the display is located only at the bottom of the display and thus weak.

In this regard, embodiments are intended to provide a display device that supports a display and provides additional rigidity to the display.

Figure 2:
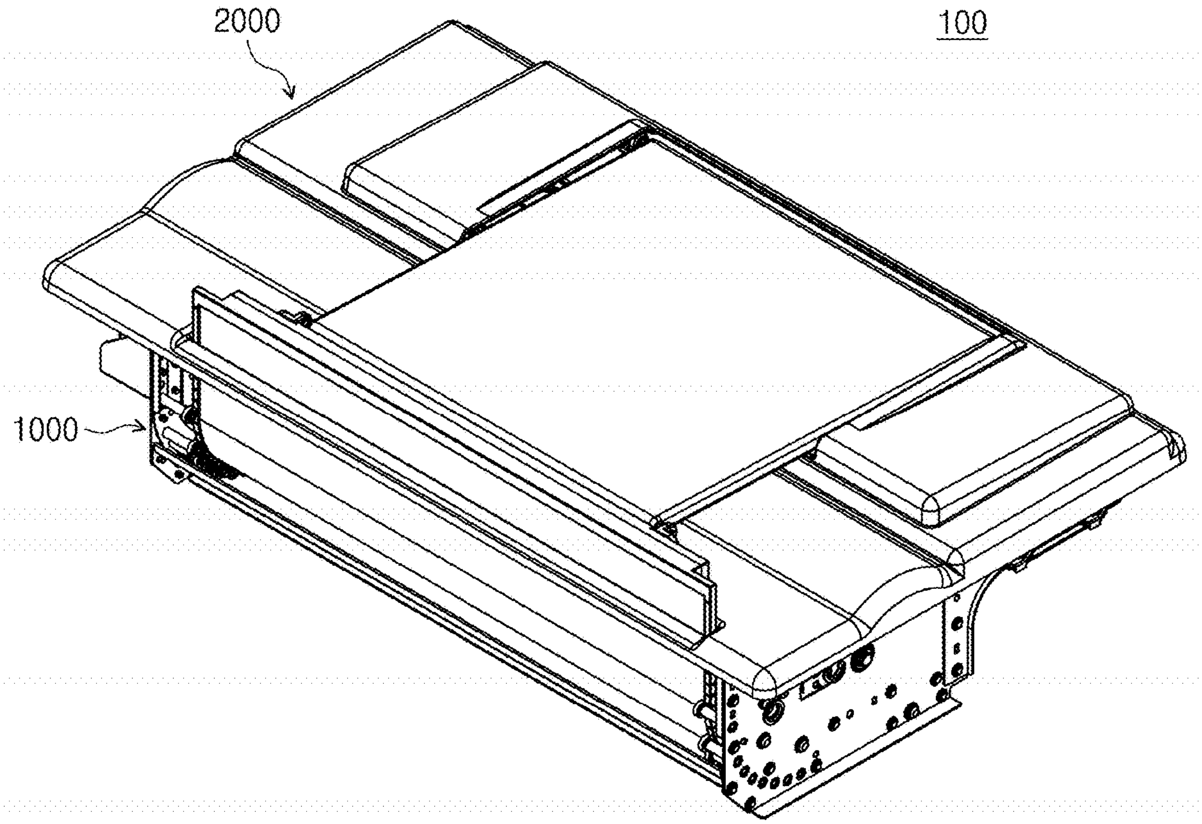
FIG. 2 illustrates a retracted display in a display device according to embodiments.
Figure 3:
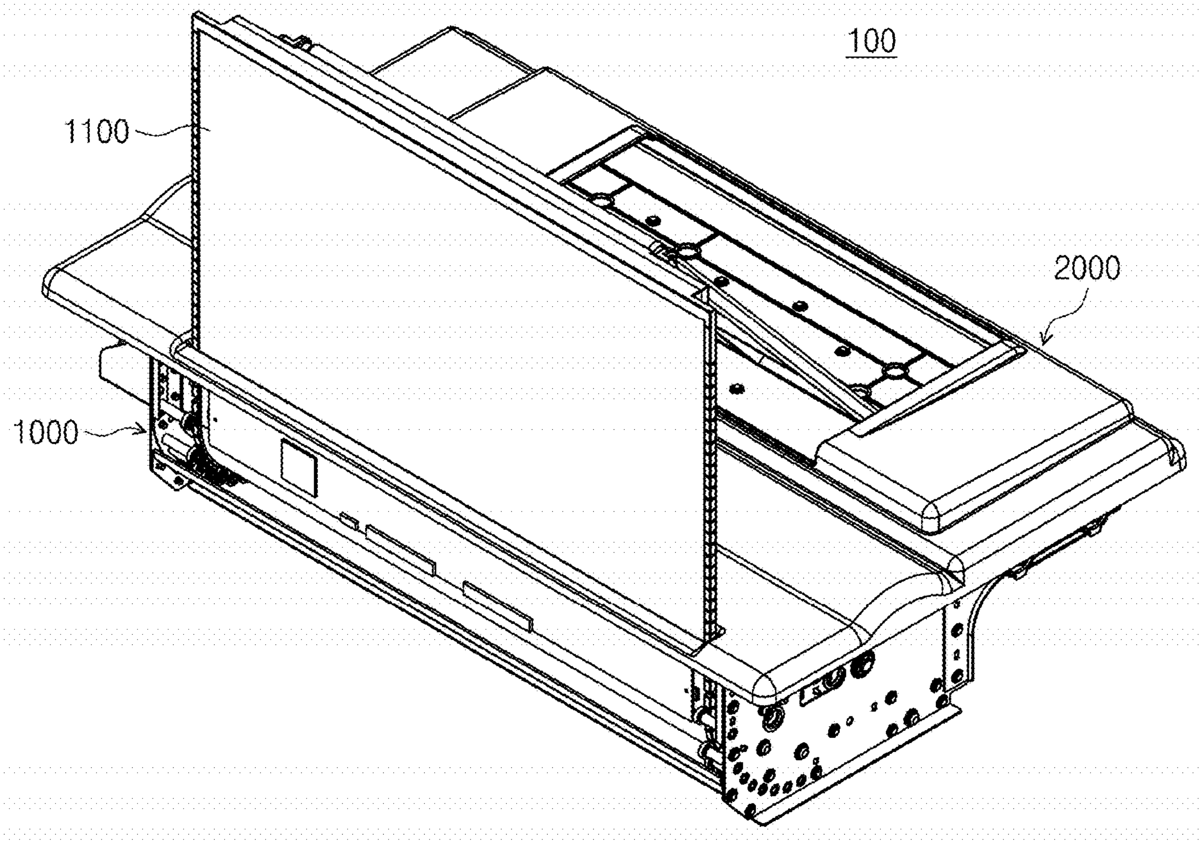
FIG. 3 illustrates an extended display in a display device according to embodiments.

FIG. 2 illustrates a retracted display in a display device according to embodiments. FIG. 3 illustrates an extended display in a display device according to embodiments.

As illustrated in FIGS. 2 and 3, a display device 100 according to embodiments may include a display unit 1000 that drives and winds/unwinds a display 1100, and a display support unit 2000 that supports the display 1100. The display support unit 2000 is preferably located at a rear end of the display unit 1000.

That is, the display device 100 according to embodiments has the effect that the display support unit 2000 is capable of supporting extension of the display 1100 without interfering with it, so that the display 1100 is not easily broken by an external force.

Figure 4:
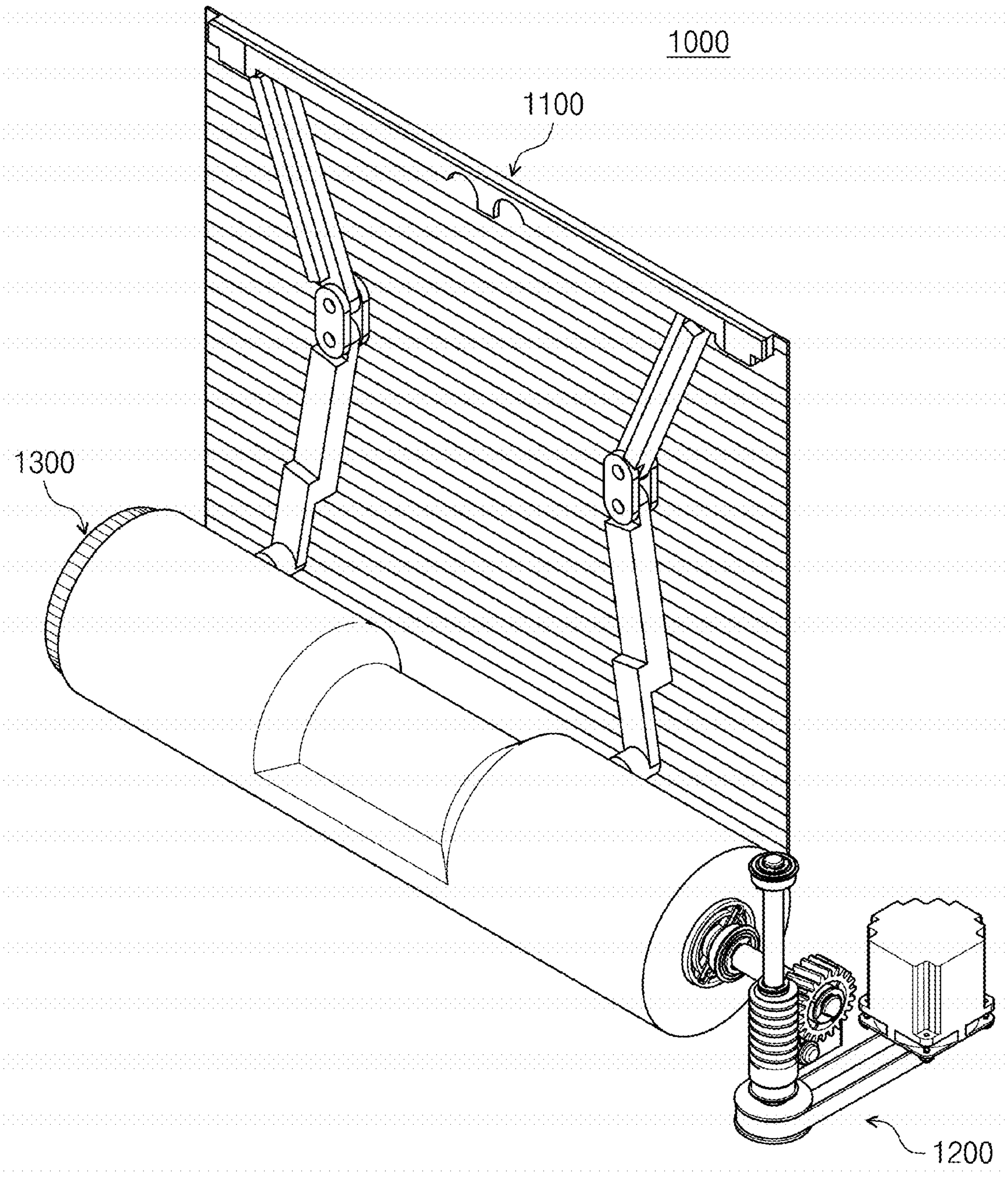
FIG. 4 illustrates a display unit in a display device according to embodiments.

FIG. 4 illustrates a display unit in a display device according to embodiments.

The display unit of FIG. 4 corresponds to the display unit illustrated in FIGS. 2 and 3.

As illustrated in FIG. 4, the display unit 1000 may include the display 1100, a display driver 1200, and a display winder 1300. A detailed description will be given of the display driver 1200 and the display winder 1300 with reference to FIG. 15.

The display 1100 may be a flexible or rollable display 1100. The display 1100 may be a plastic organic light emitting diode (POLED) display. A POLED is an organic light emitting diode (OLED) with a polyimide (PI) substrate being a type of plastic, which may implement a curved surface.

The display 1100 may be bendable, and a radius of curvature at which the display 1100 is bent may be at least 10 mm or larger. The display 1100 may include a light emitting diode (LED) (OLED, active matrix OLED (AMOLED), or passive matrix OLED (PMOLED)). The width and height of the display 1100 may be designed appropriately by those skilled in the art.

Figure 5:
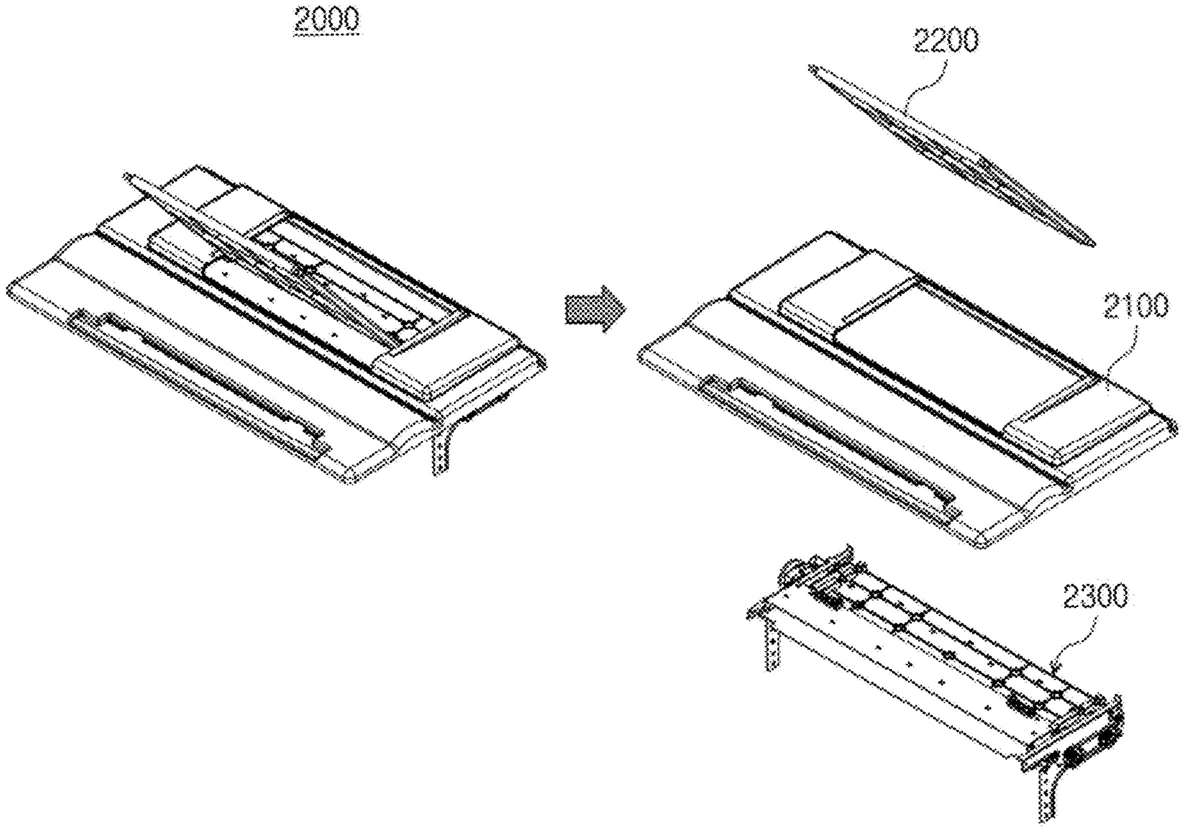
FIG. 5 is an exploded view illustrating a display support unit in a display device according to embodiments.

FIG. 5 is an exploded view illustrating a display support unit in a display device according to embodiments.

The display support unit of FIG. 5 corresponds to the display support unit illustrated in FIGS. 2 and 3.

Referring to FIG. 5, the display support unit 2000 may include a housing 2100, a supporter 2200, and a supporter fixture 2300.

The housing 2100 may have the supporter 2200 at a top end thereof and the supporter fixture 2300 therein, and may include an opening to allow the display 1100 to be extended or retracted therethrough.

Additionally, the housing 2100 may be an instrument panel (IP) itself of a vehicle. In other words, rather than the housing 2100 is added, the IP itself may be formed as the housing 2100, with the supporter fixture 2300 provided therein and the opening formed to enable extension or retraction of the display 1100. Therefore, since no additional configuration is added, there is an effect that a variety of designs are available.

The supporter 2200 is provided at the top end of the housing 2100. Particularly to support the display 1100 allowed to be retracted into or extended from the housing 2100, a top end portion of the supporter 2200 is connected to a rear top end portion of the display 1100, and a bottom end portion of the supporter 2200 is connected to the supporter fixture 2300. Therefore, as the top end portion of the supporter 2200 is connected to the rear top end portion of the display 1100, with the bottom end portion thereof fixed to the supporter fixture 2300, the supporter 2200 may support the display 1100 even when the display 1100 is fully extended. This will be described in detail with reference to FIGS. 6 and 7.

Further, the supporter 2200 is capable of moving linearly in forward and backward directions according to movement of the display 1100. For example, when the display 1100 is retracted, that is, when the display 1100 is not in use and thus is lowered, the bottom end portion of the supporter 2200 moves linearly in the backward (inward) direction of the housing 2100, and as a result, the supporter 2200 is positioned planar with the top end portion of the housing 2100 (see FIG. 2). When the display 1100 is extended, that is, when the display 1100 is raised for use, the bottom end portion of the supporter 2200 moves linearly in the forward (outward) direction of the housing 2100. As a result, the supporter 2200 is positioned inclined to the top end portion of the housing 2100 (see FIG. 3).

The supporter fixture 2300 may fix the bottom end portion of the supporter 2200 such that the supporter 2200 is movable in a straight line. That is, the supporter fixture 2300 may be located inside the housing 2100 and fix the position of the bottom end portion of the supporter 2200 according to retraction/extension of the display 1100. A detailed description will be given of the supporter fixture 2300 with reference to FIGS. 8 and 9.

Figure 6:
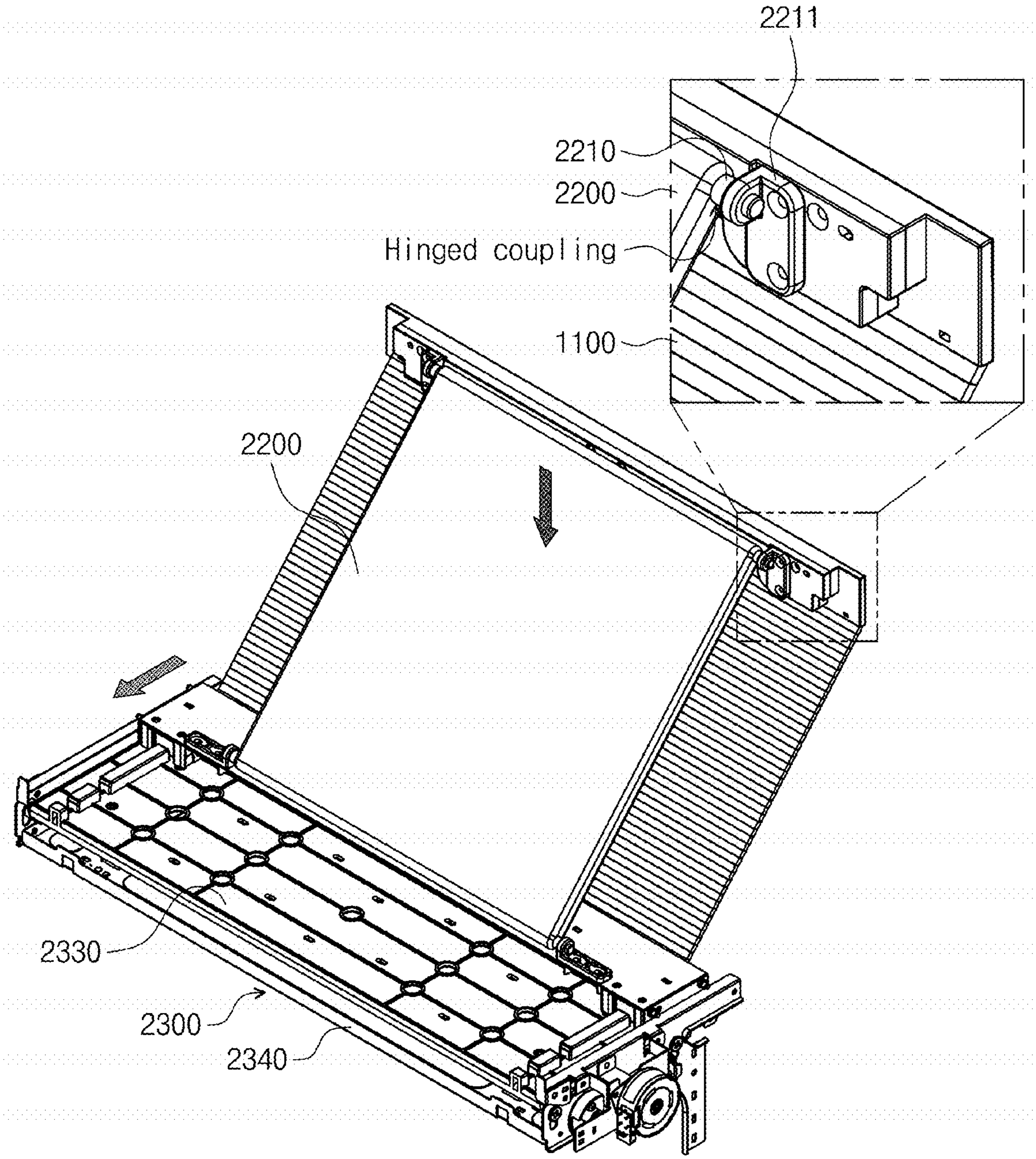
FIG. 6 illustrates a top end portion of a supporter in a display device according to embodiments.
Figure 7:
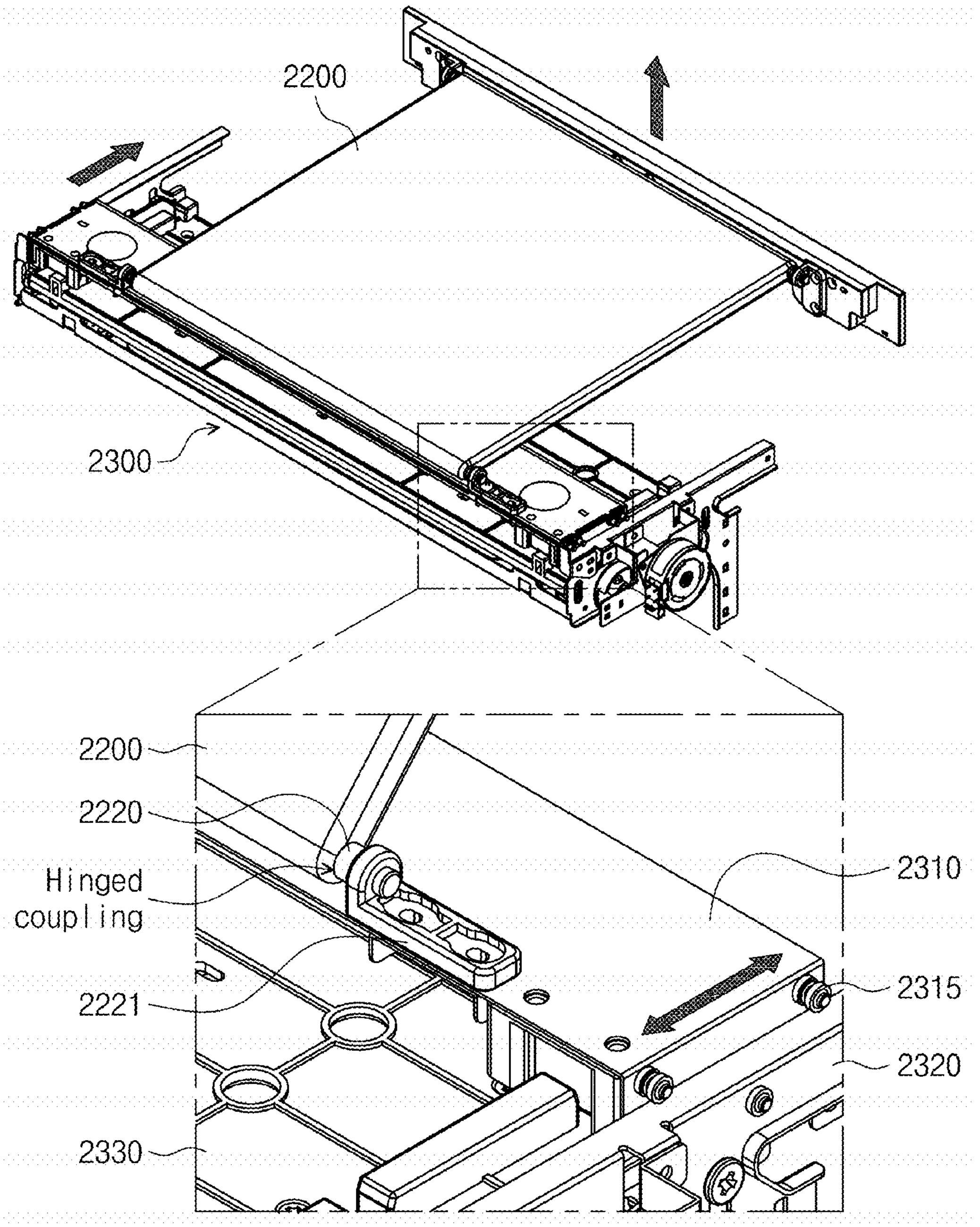
FIG. 7 illustrates a bottom end portion of a supporter in a display device according to embodiments.

FIG. 6 illustrates a top end portion of a supporter in a display device according to embodiments. FIG. 7 illustrates a bottom end portion of a supporter in a display device according to embodiments.

The supporter of FIG. 6 corresponds to the supporter illustrated in FIG. 5, and a supporter fixture of FIG. 6 corresponds to the supporter fixture illustrated in FIG. 5. The supporter of FIG. 7 corresponds to the supporter illustrated in FIG. 5, and a supporter fixture of FIG. 7 corresponds to the supporter fixture illustrated in FIG. 5.

First, with reference to FIG. 6, connection between the top end portion of the supporter 2200 and the rear top end portion of the display 1100 will be described.

First protrusions 2210 are formed on both side surfaces of the top end portion of the supporter 2200, and first coupling portions 2211 to which the first protrusions 2210 may be coupled are formed on the rear top end portion of the display 1100. More specifically, the first protrusions 2210 and the first coupling portions 2211 may be hinged. Each of the first coupling portions 2211 may include a 1a part fixedly coupled to a rear top end portion of the display 1100 and a 2a part with a first through hole formed therein, which may be hinged to a first protrusion 2210.

That is, the first protrusions 2210 formed on the side surfaces of the supporter 2200 and the first coupling portions 2211 formed on the rear top end portion of the display 1100 are hinged to each other, thereby enabling the first protrusions 2210 to rotate at the same time as they are coupled to the first through holes formed in the first coupling portions 2211. Therefore, as illustrated in FIG. 6, when the display 1100 is fully extended with the supporter 2200 inclined to the top surface of the housing 2100 (see also FIG. 3), and then lowered to be retracted, the top end portion of the supporter 2200 may also move along with the movement of the display 1100.

With reference to FIG. 7, connection between the bottom end portion of the supporter 2200 and the supporter fixture 2300 will be described.

First, the supporter fixture 2300 may include a movable plate 2310 which is slidable (or movable linearly) along with the supporter 2200 in the inward and outward directions of the housing 2100. In other words, as the bottom end portion of the supporter 2200 is connected to the movable plate 2310, the movable plate 2310 may move together with the supporter 2200.

More specifically, like the first protrusions 2210, second protrusions 2220 are formed on both side surfaces of the bottom end portion of the supporter 2200, and second coupling portions 2221 to which the second protrusions 2220 may be coupled are on a top end portion of the movable plate 2310. The second protrusion 2220 may be hinged to the second coupling portions 2221. Each of the second coupling portions 2221 may include a 1b part fixedly coupled to the top end portion of the movable plate 2310 and a 2b part formed with a second through hole formed therein, to which a second protrusion 2220 may be hinged.

That is, as the second protrusions 2220 formed on the side surfaces of the supporter 2200 are hinged to the second coupling portions 2221 formed on the top end portion of the movable plate 2310, the second protrusions 2220 may rotate at the same time as they are coupled to the second through holes formed in the second coupling portions 2221. Therefore, as illustrated in FIG. 7, when the display 1100, which has been fully retracted with the supporter 2200 planar with the top surface of the housing 2100 (see also FIG. 2), is raised to be extended, the bottom end portion of the supporter 2200 may also move along with the movement of the display 1100.

Because the supporter 2200 has the top end portion hinged to the display 1100 and the bottom end portion hinged to the movable plate 2310, the supporter 2200 may move linearly at a varying angle according to upward and downward movements of the display 1100. For example, when the display 1100 is raised to be extended, the supporter 2200 also moves in the outward (forward) direction of the housing 2100, and the movable plate 2310 also naturally moves in the outward (forward) direction of the housing 2100. When the display 1100 is lowered to be retracted, the supporter 2200 also moves in the inward (backward) direction of the housing 2100, and the movable plate 2310 naturally moves in the inward (backward) direction of the housing 2100. As described later in detail with reference to FIG. 19, as the display driver 1200 moves the display 1100, the supporter 2200 hinged to the display 1100 also moves eventually.

Figure 8:
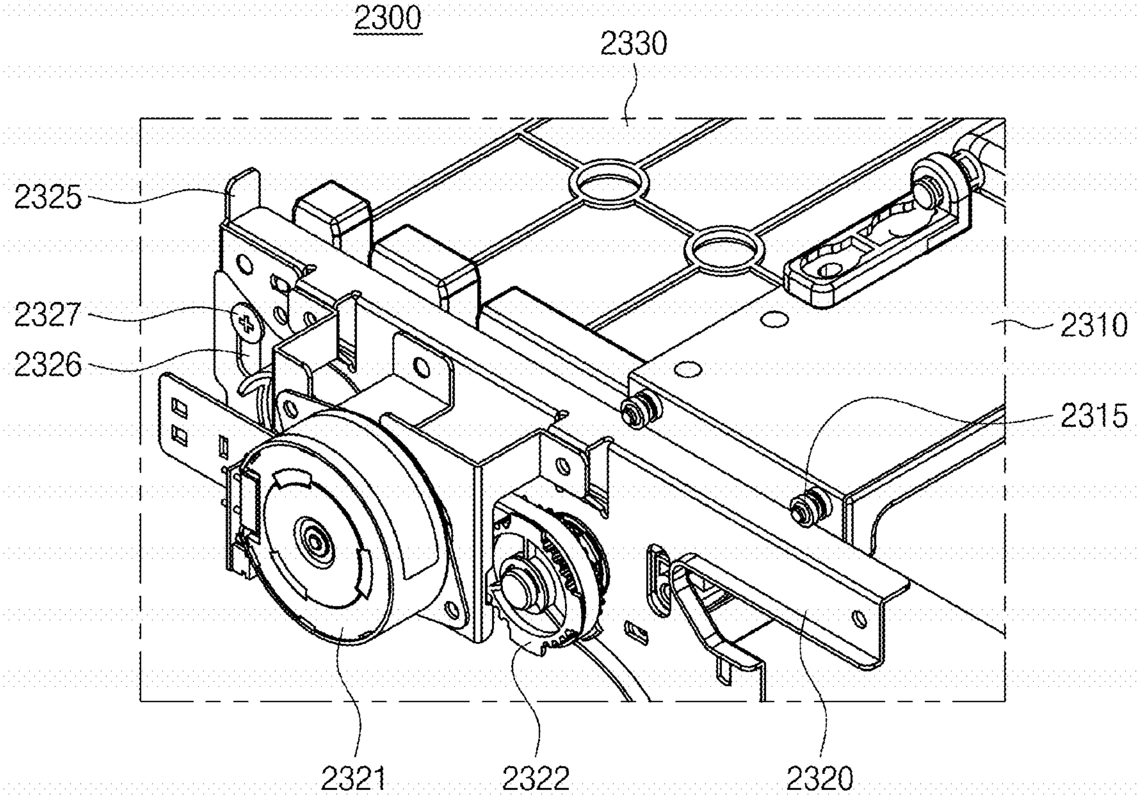
FIG. 8 illustrates a supporter fixture in a display device according to embodiments.
Figure 9:
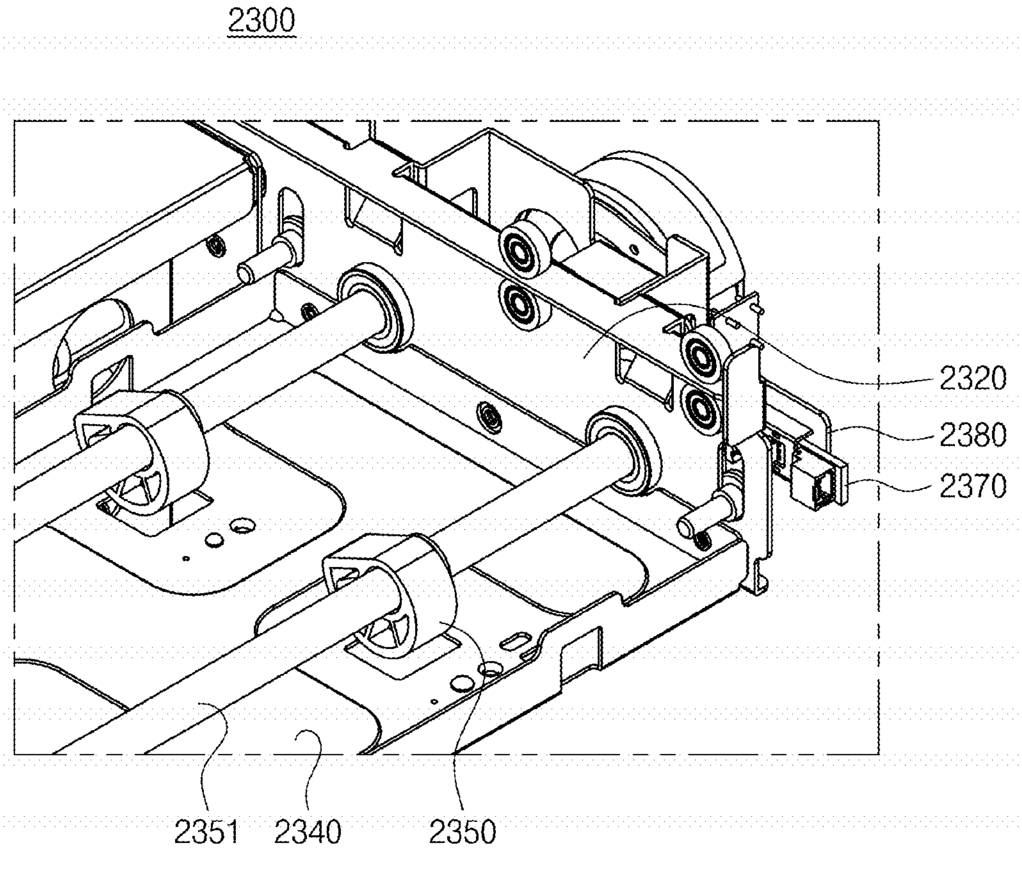
FIG. 9 illustrates a supporter fixture with a lock plate removed therefrom in a display device according to embodiments.

FIG. 8 illustrates a supporter fixture in a display device according to embodiments. FIG. 9 illustrates a supporter fixture with a lock plate removed therefrom in a display device according to embodiments.

The supporter fixture of FIG. 8 corresponds to the support fixture of FIG. 5. The support fixture of FIG. 9 corresponds to the support fixture of FIG. 5.

Referring to FIGS. 8 and 9, the supporter fixture 2300 includes the movable plate 2310, a first bracket 2320, a second motor 2321, a lock plate 2330, a plate 2340, a cam 2350, and a sensor 2370. The movable plate 2310, the lock plate 2330, and the plate 2340 are rectangular plates, the lock plate 2330 is formed on the plate 2340, and the movable plate 2310 is formed on the lock plate 2330.

A roller 2315 in line-contact with the first bracket 2320 may be formed on a side surface of the movable plate 2310. As described with reference to FIG. 7, the movable plate 2310 is slidable (movable linearly), and the roller 2315 formed on the side surface of the movable plate 2310 rotates to enable the sliding (linear movement) of the movable plate 2310.

The first bracket 2320 may be formed on side surfaces of the movable plate 2310, the lock plate 2330, and the plate 2340, and the second motor 2321, a pulley 2322, and the sensor 2370 may be provided on the first bracket 2320. Further, a first stopper 2325 that may prevent the roller 2315 from moving may be formed at an end of the first bracket 2320. The first stopper 2325 may prevent the rotational movement of the roller 2315, thereby preventing movement of the movable plate 2310 beyond an operating range of the movable plate 2310.

The second motor 2321 may transmit a driving force to the cam 2350 so that the lock plate 2330 may move. The second motor 2321 may be a stepping motor or a pulse motor.

A shaft 2351 and the cam 2350 may be provided between the lock plate 2330 and the plate 2340. Referring to FIG. 9 illustrating the supporter fixture 2300 with the lock plate 2330 removed therefrom, the shaft 2351 has one end and the other end fixed to first brackets 2320 and is located above the plate 2340, and the cam 2350 is fixed to the shaft 2351. That is, the shaft 2351 rotates by receiving a driving force transmitted from the second motor 2321, thereby rotating the cam 2351 fixed to the shaft 2351 together with the shaft 2351. This will be described in detail with reference to FIG. 10.

The supporter fixture 2300 may include the sensor 2370. The sensor 2370 may be a photo interrupter (PI) sensor. The sensor 2370 may or may not pass through a hole 2361 formed on a sensed portion 2360 that rotates together with the cam 2350, depending on a rotation state of the cam 2350, which will be described in detail with reference to FIG. 13.

Figure 10:
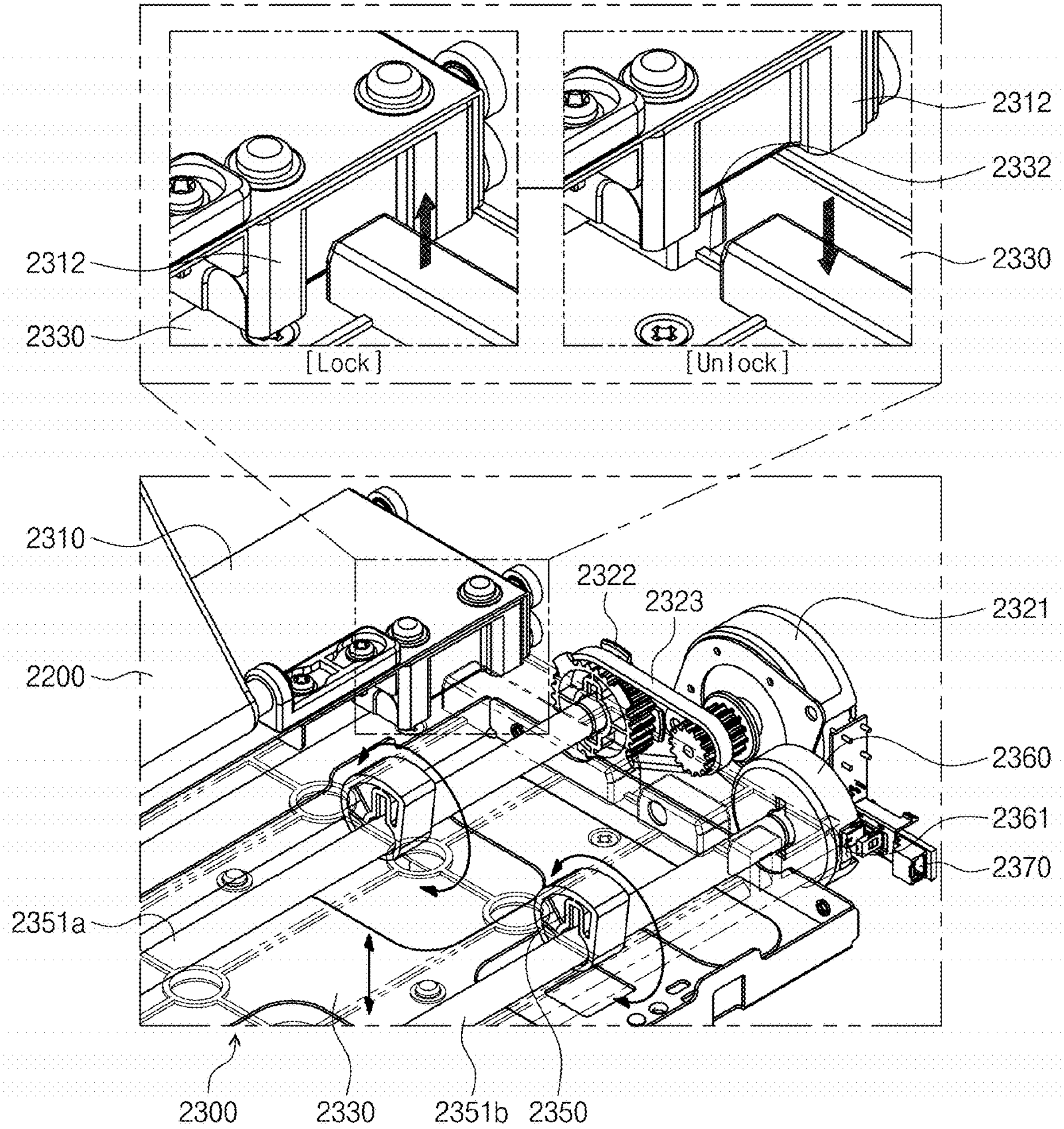
FIG. 10 illustrates upward and downward movements of a lock plate in a supporter fixture of a display device according to embodiments.
Figure 11:
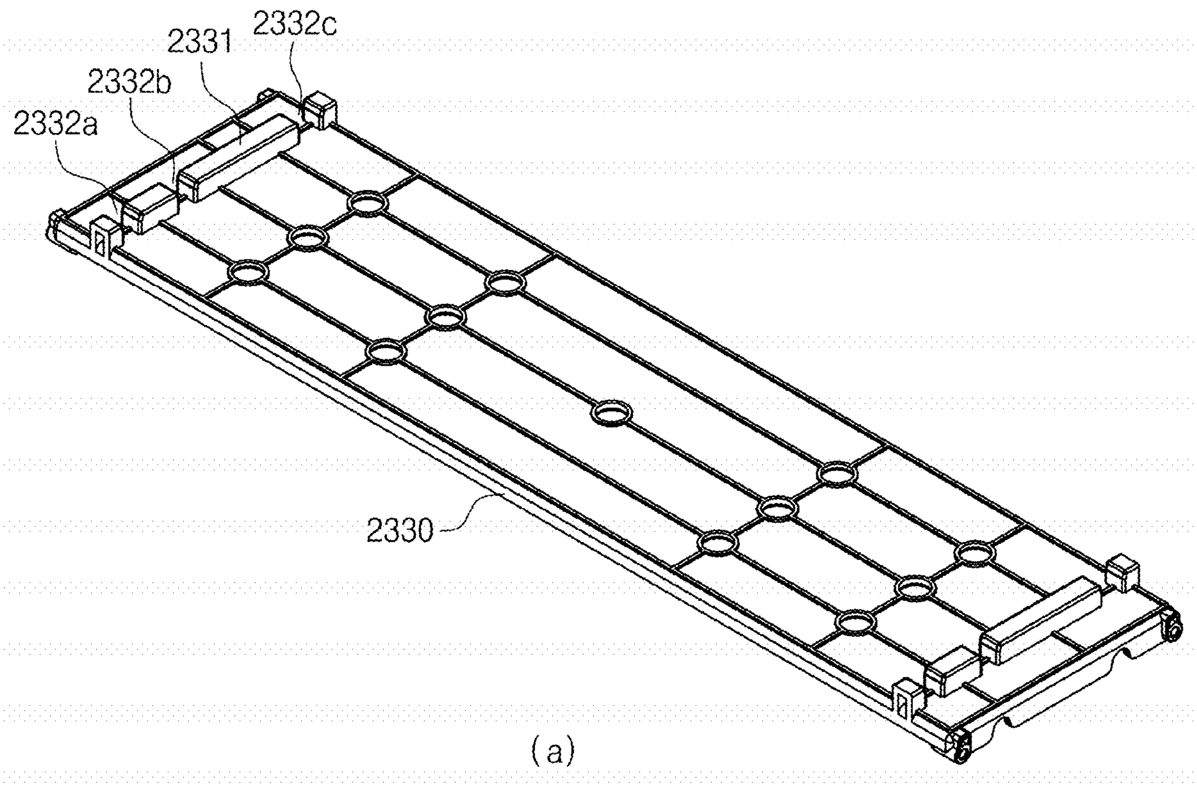
FIG. 11 illustrates a lock plate and a cam in a supporter fixture of a display device according to embodiments.
Figure 11:
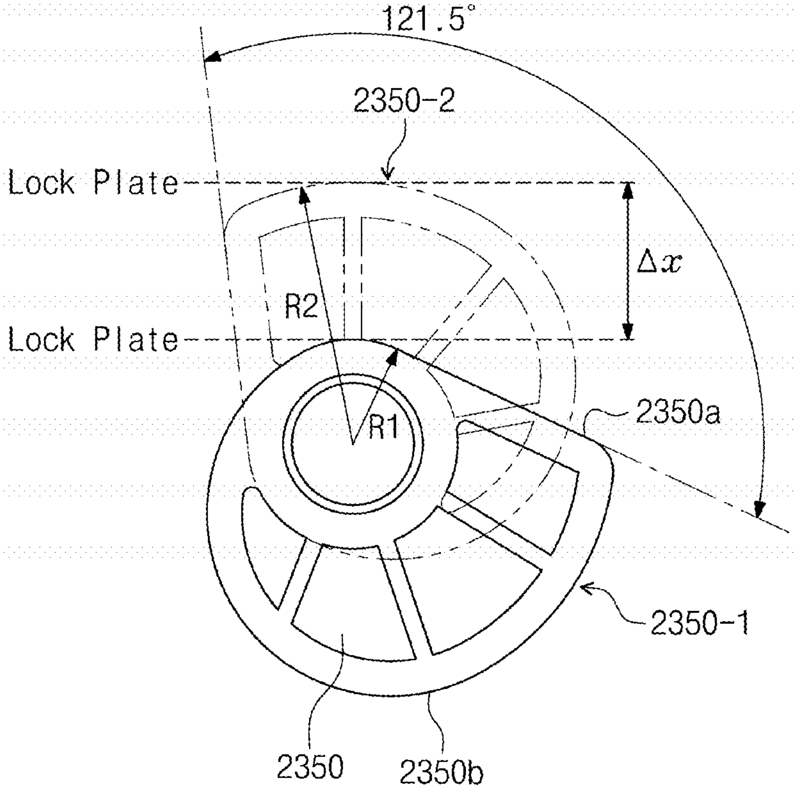

FIG. 10 illustrates upward and downward movements of a lock plate in a support fixture of a display device according to embodiments. FIG. 11 illustrates a lock plate and a cam in a support fixture of a display device according to embodiments. More specifically, FIG. 11(*a*) illustrates the lock plate, and FIG. 11(*b*) illustrates the cam.

The support fixture of FIG. 10 corresponds to the support fixture of FIGS. 8 and 9. The lock plate of FIG. 11 corresponds to the lock plate of FIGS. 8 and 10. The cam of FIG. 11 corresponds to the cam of FIGS. 9 and 10.

In order to describe upward and downward movements of the lock plate 2230, the principle of transmitting a driving force to the cam 2350 by the second motor 2321 will be described.

As described with reference to FIGS. 8 and 9, the second motor 2321 may transmit a driving force to the cam 2350 so that the lock plate 2330 may move. Herein, various gear components may be used to connect the second motor 2321 and the cam 2350 to each other.

As illustrated in FIG. 10, two shafts 2351 may be provided: a first shaft 2351*a* and a second shaft 2351*b*. The pulley 2322 may be formed at one end of the first shaft 2351*a*. Because the pulley 2322 is connected to the second motor 2321 by a second timing belt 2323, the driving force of the second motor 2321 may be transmitted to the first shaft 2351*a*. The sensed portion 2360 may be formed at one end of the second shaft 2351*b*, which will be described in detail with reference to FIG. 13.

A pulley may also be formed at each of the other ends of the first shaft 2351*a* and the second shaft 2351*b*. Similarly, the pulleys formed on the other ends of the first shaft 2351*a* and the second shaft 2351*b* may be connected by a second timing belt, thereby enabling transmission of the driving force of the second motor 2321 to the second shaft 2351*b* as well as the first shaft 2351*a*. Although the description has been made in the context of two shafts 2351 in FIG. 10, the same may apply even when more than two shafts 2351 are used.

Accordingly, regardless of the number of shafts 2351, the driving force of the second motor 2321 is transmitted to the shaft 2351 and eventually to the cam 2350 fixedly connected to the shaft 2351. The cam 2350 may rotate by the received driving force, and a rotation axis of the cam 2350 may be identical to a rotation axis of the shaft 2351. Additionally, the cam 2350 comes into surface-contact with a portion of the lock plate 2330, which allows the lock plate 2330 to move upward and downward by the rotation of the cam 2350.

Referring to FIG. 11(*b*) together, the cam 2350 may include a first surface 2350*a* formed in a straight line and a second surface 2350*b* formed in a curve with a decreasing curvature. In other words, the cam 2350 is not disk-shaped, but has a bottom surface which is straight on one side thereof and curved on the other side thereof. The shaft 2351 may be positioned to pass through a point where the first surface 2350*a* and the second surface 2350*b* meet.

Since the second surface 2350*b* is formed in a curve with a decreasing curvature, different radiuses are formed from a center of rotation through which the shaft 2341 of the cam 2350 passes to the second surface 2350*b*. The reason that the second surface 2350*b* of the cam 2350 is not a constant curve but a curve with a decreasing curvature is that the rotation of the cam 2350 allows the lock plate 2330 to move upward and downward.

That is, for example, when the bottom surface of the cam 2350 is formed in a circle with a constant radius, the lock plate 2330 is not capable of moving due to the constant radius even when the cam 2350 rotates. However, since the cam 2350 of the display device 100 according to embodiments include the first surface 2350*a* formed in a straight line and the second surface 2350*b* formed in a curve with a decreasing curvature, when the cam 2350 rotates, its radius may become smaller or larger depending on a rotation direction of the cam 2350.

Therefore, when the cam 2350 rotates in a direction in which the radius decreases, the lock plate 2330 may move in an upward direction, and when the cam 2350 rotates in a direction in which the radius increases, the lock plate 2330 may move in a downward direction. With a cam 2350-1 in a high saturation state illustrated in FIG. 11(*b*), the lock plate 2330 is fully moved downward, and with a cam 2350-2 in a low saturation state, the lock plate 2330 is fully moved upward. Upward and downward movements of the lock plate 2330 according to the rotation of the cam 2350 will be described in detail with reference to FIGS. 14 and 15.

Referring to FIG. 11(*a*), the lock plate 2330 may include a plurality of protrusions 2331 protruding at a certain height on a side thereof and a concave groove 2332 formed between the plurality of protrusions 2331. Although three concave grooves are illustrated in FIG. 11(*a*), the number of concave grooves 2332 is not limited, and the number of concave grooves 2332 may be determined depending on the number of modes based on exposure of the display 1100. For example, when a fully retracted state of the display 1100 is a first mode and a fully extended state of the display 1100 is a fourth mode, three concave grooves 2332 may be formed, or when the fully retracted state of the display 1100 is a first mode and the fully extended state of the display 1100 is a fifth mode, four concave grooves 2332 may be formed.

Referring to FIG. 10 together, the movable plate 2310 may include a block member 2312 on a bottom end portion thereof, and a concave groove 2332 of the lock plate 2330 may accommodate the block member 2312. That is, when the lock plate 2330 moves upward, the block member 2312 is located in the concave groove 2332. As a consequence, the movable plate 2310 is locked to the lock plate 2330, blocked from moving by the protrusions 2331. In addition, when the lock plate 2330 moves downward, the block member 2312 is not located in the concave groove 2332, and as a result, the movable plate 2310 is unlocked from the lock plate 2330, thus being allowed to move.

More specifically, the block member 2312 is located, that is, accommodated in a different concave groove 2332 depending on a mode based on exposure of the display 1100, which will be described in detail with reference to FIG. 20.

Figure 12:
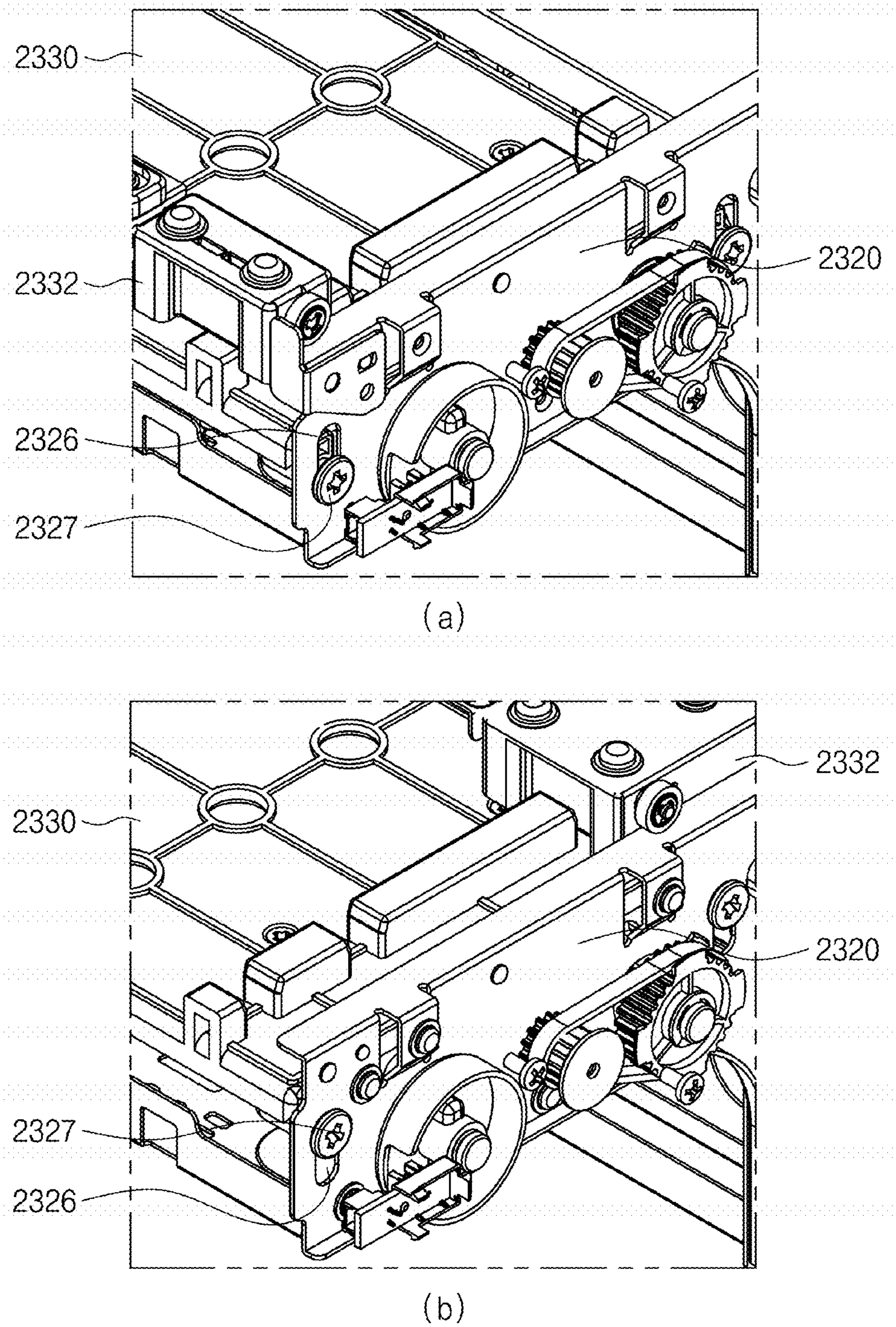
FIG. 12 illustrates a second stopper in a supporter fixture of a display device according to embodiments.

FIG. 12 illustrates a second stopper of a support fixture in a display device according to embodiments. More specifically, FIG. 12(*a*) illustrates a case in which the lock plate moves downward, and FIG. 12(*b*) illustrates a case in which the lock plate moves upward.

A first bracket of FIG. 12 corresponds to the first bracket of FIG. 8. The lock plate of FIG. 12 corresponds to the lock plate in FIGS. 10 and 11(*a*). A block member of FIG. 12 corresponds to the block member of FIG. 10.

Referring to FIG. 12, the supporter fixture 2300 may include a through hole 2326 and a second stopper 2327. More specifically, an oval-shaped through hole 2326 is formed on the first bracket 2320, and the second stopper 2327 connected to the lock plate 2330 may move inside the through hole 2326. The second stopper 2327 is formed larger than the through hole 2326 and thus is not allowed to pass through the through hole 2326. Therefore, the lock plate 2330 may not move upward and downward beyond its operating range.

For example, when the lock plate 2330 moves downward, the second stopper 2327 connected to the lock plate 2330 gets caught on the other end of the through hole 2326, and thus the lock plate 2330 may move downward no further (see FIG. 12(*a*)). Alternatively, when the lock plate 2330 moves upward, the second stopper 2327 connected to the lock plate 2330 gets caught on one end of the through hole 2326, and thus the lock plate 2330 may move upward no further (see FIG. 12(*b*)). That is, a range in which the lock plate 2330 moves upward and downward may be adjusted by adjusting the length of the through hole 2326.

Figure 13:
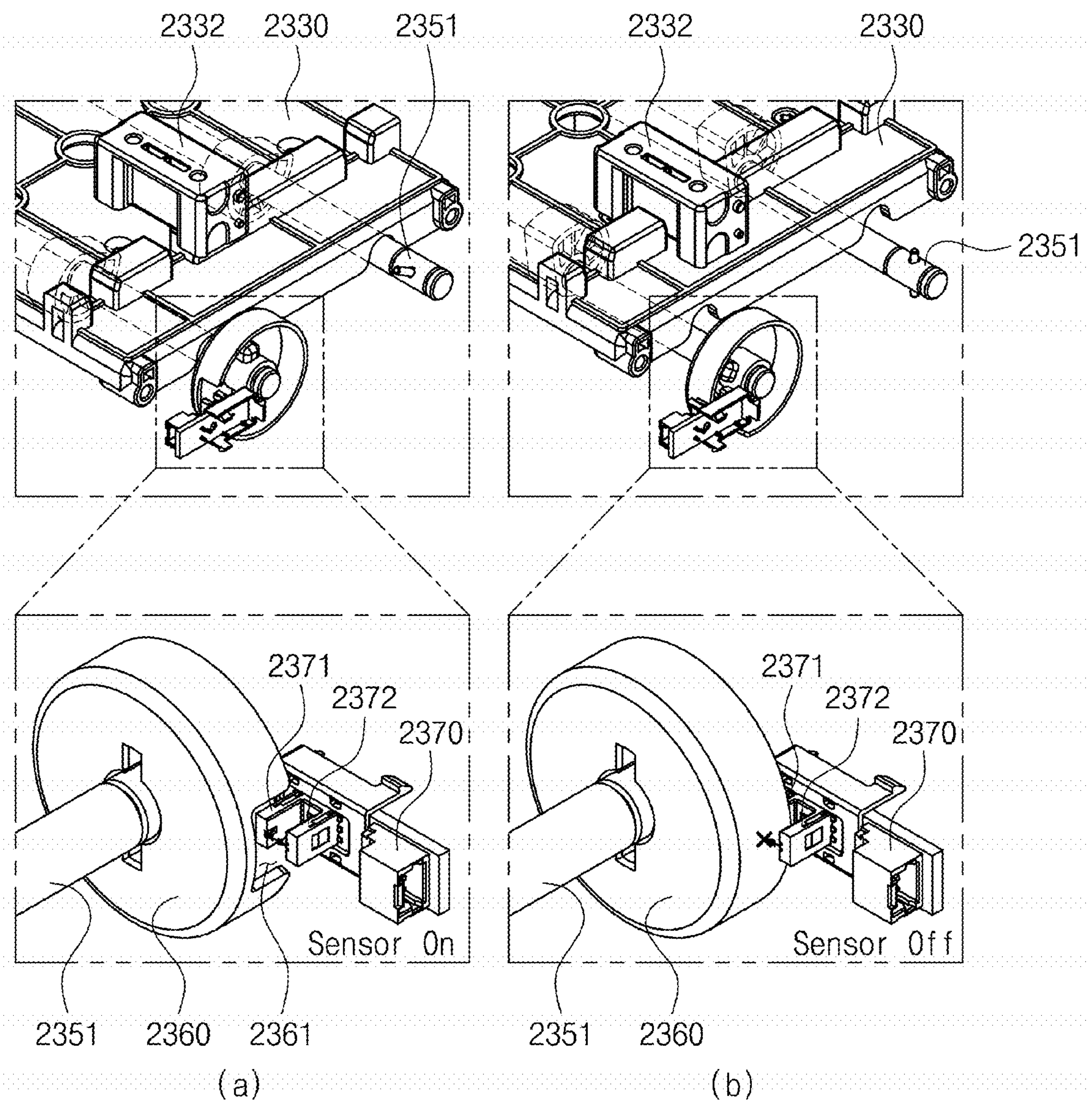
FIG. 13 illustrates the operating principle of a sensor in a supporter fixture of a display device according to embodiments.

FIG. 13 illustrates the operating principle of a sensor in a support fixture of a display device according to embodiments. More specifically, FIG. 13(*a*) illustrates a sensor-on state, and FIG. 13(*b*) illustrates a sensor-off state.

A sensed portion of FIG. 13 corresponds to the sensed portion of FIG. 10. A sensor of FIG. 14 corresponds to the sensor in FIGS. 9 and 10. A lock plate of FIG. 13 corresponds to the lock plate in FIGS. 10 and 11(*a*). A block member of FIG. 13 corresponds to the block member of FIG. 10.

The sensor 2370 includes a light emitter 2371 that emits light and a light receiver 2372 that receives the light from the light emitter 2371. Referring to FIG. 10, the sensed portion 2360 may be formed at one end of the second shaft 2351*b*, on which the pulley 2322 is not formed. The sensed portion 2360 includes a circular plate as a bottom surface and a side plate protruding from an edge of the circular plate at a certain height in a direction perpendicular to the circular plate, and the side plate includes a hole 2361 sensible by the sensor 2370.

When the shaft 2351 rotates, the sensed portion 2360 connected to one end of the shaft 2351 also rotates together with the shaft 2351. More specifically, the sensed portion 2360 rotates around the same rotation axis as the shaft 2351 along with the position of the hole 2361. Because the sensor 2370 is fixed to the second bracket 2380 which is fixed to the first bracket 2320 as illustrated in FIG. 9, the sensor 2370 is fixed in position regardless of the rotation of the sensed portion 2360.

The sensed portion 2360 is an actuator, and on/off of the sensor 2370 is determined depending on whether the sensor 2370 passes through the hole 2361 formed on the sensed portion 2360.

For example, as illustrated in FIG. 13(*a*), when the sensor 2370 passes through the hole 2361 formed on the sensed portion 2360, the light receiver 2372 of the sensor 2370 may receive light from the light emitter 2371, and thus the sensor 2370 is in an on state. As illustrated in FIG. 13(*b*), when the sensor 2370 does not pass through the hole 2361 formed on the sensed portion 2360 according to rotation of the sensed portion 2360, the sensed portion 2360, more specifically, the light receiver 2372 of the sensor 2370 may not receive light from the light emitter 2371 due to the side plate, and thus the sensor 2370 is in an off state.

When the sensor 2370 is in the on state, the lock plate 2330 moves downward so that the block member 2312 is not located in a concave groove 2332, and thus the movable plate 2310 is not locked to the lock plate 2330. When the sensor 2370 is in the off state, the lock plate 2330 moves upward so that the block member 2312 is located in a concave groove 2332, and thus the movable plate 2310 is locked to the lock plate 2330. This is because whether to drive the second motor 2321 is controlled depending on the on/off state of the sensor 2370, and as a result, upward and downward movements of the lock plate 2330 are determined, which will be described in detail with reference to FIGS. 14 and 15.

Figure 14:
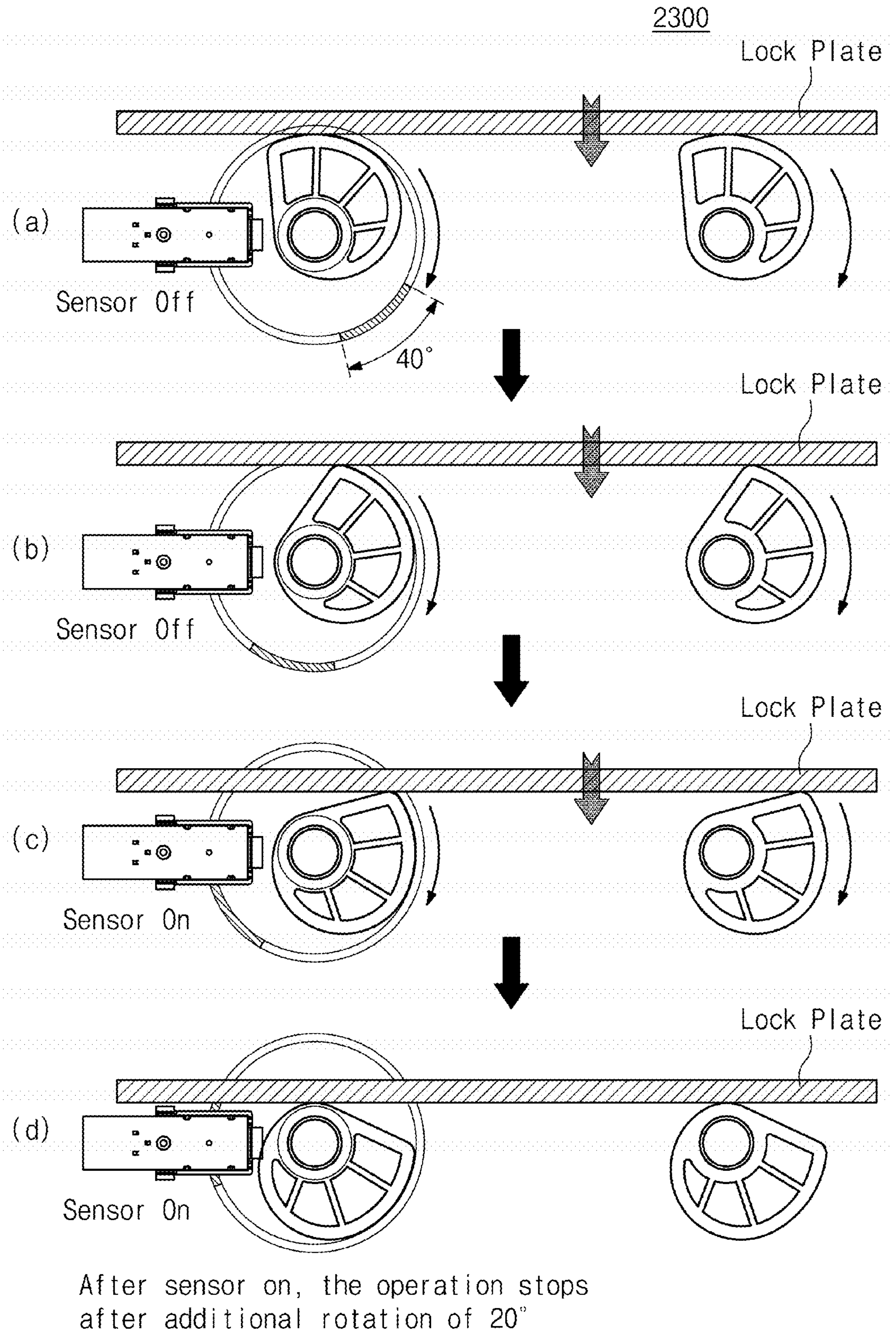
FIG. 14 illustrates the principle of moving a lock plate in a downward direction in a supporter fixture of a display device according to embodiments.
Figure 15:
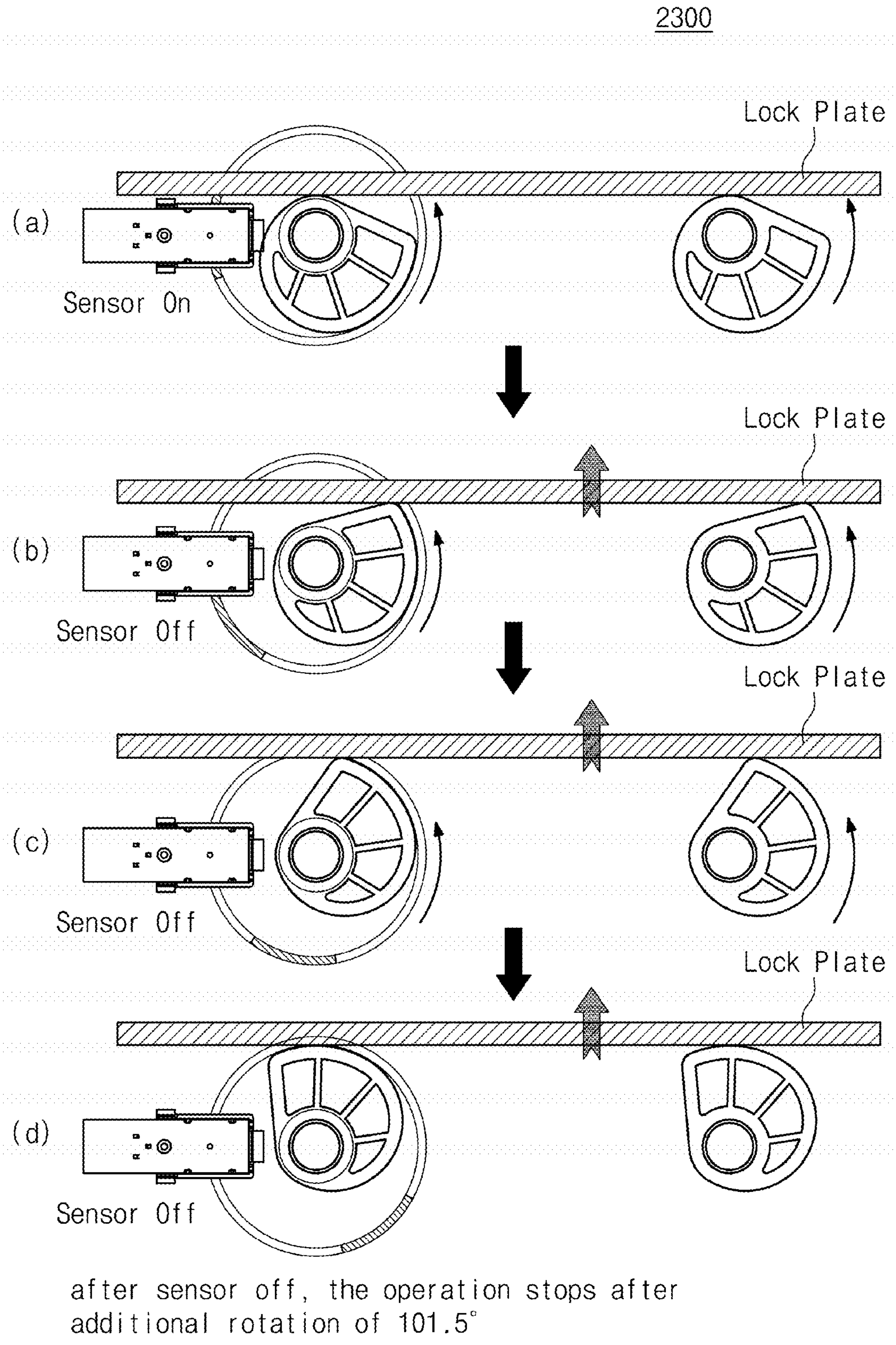
FIG. 15 illustrates the principle of moving a lock plate in an upward direction in a supporter fixture of a display device according to embodiments.

FIG. 14 illustrates the principle of moving a lock plate downward in a support fixture of the display device according to embodiments. FIG. 15 illustrates the principle of moving a lock plate upward in a support fixture of the display device according to embodiments.

A support fixture of FIG. 14 corresponds to the support fixture of FIGS. 8 and 10. The lock plate of FIG. 14 corresponds to the lock plate in FIGS. 10 and 11(*a*). A sensed portion of FIG. 14 corresponds to the sensed portion of FIG. 13. A sensor of FIG. 14 corresponds to the sensor of FIG. 13. The support fixture of FIG. 15 corresponds to the support fixture of FIGS. 8 and 10. The lock plate of FIG. 15 corresponds to the lock plate in FIGS. 10 and 11(*a*). A sensed portion of FIG. 15 corresponds to the sensed portion of FIG. 13. A sensor of FIG. 15 corresponds to the sensor of FIG. 13.

Referring to FIG. 14, it illustrates the operating principle of the supporter fixture 2300 when the movable plate 2310 is changed from a locked state with respect to the lock plate 2330 to an unlocked state with respect to the lock plate 2330. In other words, FIG. 14 illustrates a case in which the movable plate 2310 needs to move in order to retract or extend the display 1100.

As illustrated in FIG. 14, with the lock plate 2330 of the supporter fixture 2300 fully raised, the cam 2350 of the supporter fixture 2300 is positioned such that a portion of the second surface 2350*b* with a small curvature is in contact with the lock plate 2330 (see the cam 2350-2 in the low saturation state in FIG. 11(*b*). Therefore, the sensor 2370 naturally does not pass through the hole 2361 formed on the sensed portion 2360, blocking the light receiver 2372 from receiving light, and thus is in the off state (see FIG. 14(*a*)).

Then, in order to move the lock plate 2330, the second motor 2321 starts to rotate in a clockwise direction, which in turn causes the shaft 2351 connected to the second motor 2321 to rotate, and eventually the cam 2350 and the sensed portion 2360 connected to the shaft 2351 also start to rotate in the clockwise direction (see FIG. 14(*b*)).

At this time, the cam 2350 rotates in a direction in which the first surface 2350*a* comes into contact with the lock plate 2330. Since the cam 2350 was initially positioned such that the small-curvature portion, that is, a large-radius portion of the second surface 2350*b* is in contact with the lock plate 2330, the lock plate 2330 may eventually move linearly in the downward direction by the rotation of the cam 2350 in the direction in which the first surface 2350*a* formed in a straight line comes into contact with the lock plate 2330.

When the sensor 2370 passes through the hole 2361 formed on the sensed portion 2360 during the clockwise rotation of the cam 2350 and the sensed portion 2360, the light receiver 2372 of the sensor 2370 may receive light, and thus the sensor 2370 is changed from the off state to the on state (see FIG. 14(*c*)).

When the sensor 2370 is changed from the off state to the on state, the second motor 2321 stops rotating. However, the second motor 2321 does not immediately stop rotating. Instead, after the cam 2350 and the sensed portion 2360 rotate further by 200 in the clockwise direction in the on state of the sensor 270, the second motor 2321 stops rotating (see FIG. 14(*d*)).

The reason that the second motor 2321 operates further without immediately discontinuing rotating in the on state of the sensor 2370 is to position the sensor 2370 at the center of the hole 2361 formed on the sensed portion 2360. Referring to FIG. 14(*a*) together, since the angle of the hole 2361 is 40°, the cam 2350 additionally rotates by 20° in the clockwise direction and then the second motor 2321 stops rotating.

That is, when the sensor 2370 is turned on, the second motor 2321 rotates further such that the cam 2350 performs an additional operation to position the sensor 2370 at the center of the hole 2361, rather than it immediately stops rotating.

A state in which the operation of the second motor 2321 is completely stopped is a state in which the lock plate 2330 is fully lowered, which means that the movable plate 2310 is not locked to the lock plate 2330 and thus movable. The cam 2350 at this time refers to the cam 2350-1 in the high saturation state illustrated in FIG. 11(*b*).

That is, in the progress from FIG. 14(*a*) to FIG. 14(*d*), the cam 2350 rotates from a state indicated by a dotted line to a state indicated by a solid line in FIG. 11(*b*). Herein, the cam 2350 may rotate by 121.5° with respect to the first surface 2350*a*, as illustrated in FIG. 11(*b*). Therefore, because the cam 2350 rotates further by 20° in the same clockwise direction in the progress from FIG. 14(*c*) to FIG. 14(*d*), clockwise rotation of the cam 2350 by 101.5° in the off state of the sensor 2370 as illustrated in FIG. 14(*a*) places the sensor 2370 in the on state as illustrated in FIG. 14(*c*).

Further, referring to FIG. 11(*b*) together, a movement length $\Delta x$ of the lock plate 2330 may be determined according to a radius $R_1$ from the center of rotation of the cam 2350 to the first surface 2350*a* and a radius $R_2$ from the center of rotation of the cam 2350 to the small-curvature portion of the second surface 2350*b*. The user may adjust the movement length $\Delta x$ of the lock plate 2330 by adjusting $R_1$ and $R_2$, where $\Delta x$ is twice the difference between $R_1$ and $R_2$.

For example, when the radius $R_1$ from the center of rotation of the cam 2350 to the first surface 2350*a* is 10.5 mm, and radius $R_2$ from the center of rotation of the cam 2350 to the small-curvature portion of the second surface 2350*b* is 15 mm, the distance $\Delta x$ by which the lock plate 2330 may move up and down is 9 mm, twice the difference of 4.5 mm between $R_1$ and $R_2$.

Referring to FIG. 15, it illustrates the operating principle of the supporter fixture 2300 when the movable plate 2310 is changed from the unlocked state with respect to the lock plate 2330 to the locked state with respect to the lock plate 2330. In other words, FIG. 15 illustrates a case in which the display 1100 stops moving and the movable plate 2310 also does not need to move.

As illustrated in FIG. 15, with the lock plate 2330 of the supporter fixture 2300 fully lowered, the cam 2350 of the supporter fixture 2300 is positioned such that a large-curvature portion of the second surface 2350*b* comes into contact with the lock plate 2330 (see the cam 2350-1 in the high saturation state in FIG. 11(*b*)). Thus, the sensor 2370 naturally passes through the hole 2361 formed on the sensed portion 2360, allowing the light receiver 2372 to receive light, and is in the on state (see FIG. 15(*a*)). This state may be the same as the state of FIG. 14(*d*).

Then, in order to move the lock plate 2330, the second motor 2321 starts to rotate in a counterclockwise direction, which in turn causes the shaft 2351 connected to the second motor 2321 to rotate together. Eventually, the cam 2350 and the sensed portion 2360 connected to the shaft 2351 also start to rotate in the counterclockwise direction (see FIG. 15(*b*)).

When the sensor 2370 no longer passes through the hole 2361 formed on the sensed portion 2360 during the counterclockwise rotation of the cam 2350 and the sensed portion 2360, the light receiver 2372 of the sensor 2370 is not allowed to receive light, thereby changing the sensor 2370 from the on state to the off state (see FIG. 15(*b*)). In this case, because the sensor 2370 was located at the center of the hole 2361 with the lock plate 2330 fully lowered, counterclockwise rotation of the cam 2350 and the sensed portion 2360 by 200 places the sensor 2370 in the off state.

At this time, the cam 2350 rotates in the direction in which the first surface 2350*a* comes into contact with the lock plate 2330, as described with reference to FIG. 14. Since the cam 2350 was initially positioned such that the large-curvature portion, that is, a small-radius portion of the second surface 2350*b* is in contact with the lock plate 2330, the lock plate 2330 may move linearly in the upward direction by rotation of the cam 2350 in the direction in which the first surface 2350*a* formed in a straight line comes into contact with the lock plate 2330 (see of FIG. 14(*c*)).

After the sensor 2370 is turned off and then the cam 2350 rotates by 101.5° in the counterclockwise direction, the second motor 2321 stops rotating (see FIG. 15(*d*)). Referring to FIG. 11(*b*) together, the cam 2350 may be located in a state in which the lock plate 2330 is fully lowered (the high saturation state) and in a state in which the lock plate 2330 is fully raised (the low saturation state). When rotating from the fully lowered state to the fully raised state, the cam 2350 rotates such that the first surface 2350*a* rotates by an angle of 101.5°.

Therefore, with the cam 2350 already rotated by 200 in the counterclockwise direction, the sensor 2370 is changed to the off state in FIG. 15(*b*), and thus the cam 2350 simply needs to additionally rotate by 101.5° in the counterclockwise direction after the sensor 2370 is placed in the off state, to fully raise the lock plate 2330.

That is, the second motor 2321 stops rotating after the cam 2350 rotates by 101.5° in the counterclockwise direction in the off state of the sensor 2370. A state in which the second motor 2321 completely stops rotating is the fully raised state of the lock plate 2330, which means that the movable plate 2310 is locked to the lock plate 2330 and thus not movable. The cam 2350 at this time refers to the cam 2350-2 in the low saturation state illustrated in FIG. 11(*b*).

Figure 16:
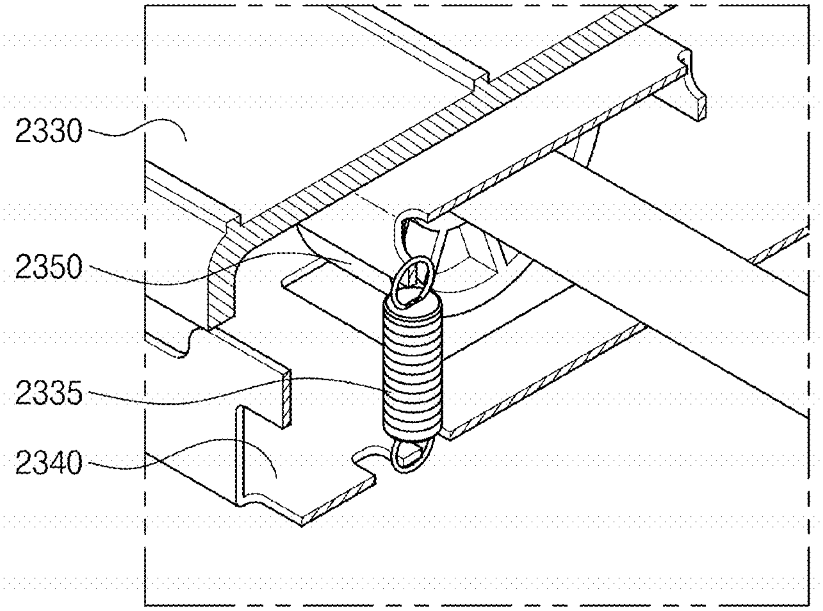
FIG. 16 illustrates a spring in a supporter fixture of a display device according to embodiments.
Figure 17:
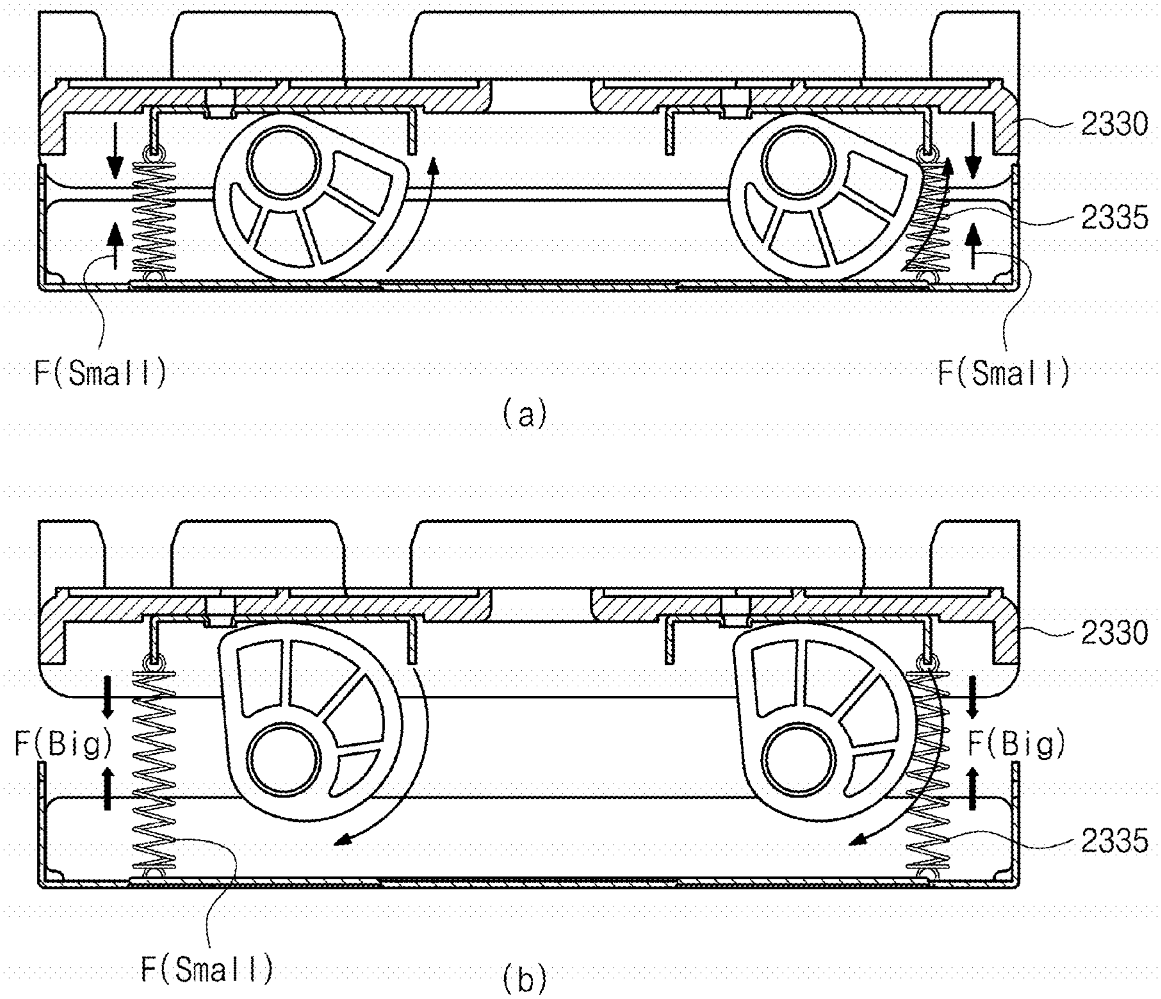
FIG. 17 illustrates the operating principle of a spring in a display device according to embodiments.

FIG. 16 illustrates a spring in a support fixture of a display device according to embodiments. FIG. 17 illustrates the operating principle of a spring in a display device according to embodiments. More specifically, FIG. 17(*a*) illustrates a state in which a lock plate is fully lowered, and FIG. 17 (*b*) illustrates a state in which the lock plate is fully raised.

The support fixture of FIG. 16 corresponds to the support fixture in FIGS. 8 and 9. A support fixture of FIG. 17 corresponds to the support fixture in FIGS. 8 and 9.

Referring to FIG. 16, the supporter fixture 2300 may include a spring 2335 that provides an elastic force in a direction of movement of the lock plate 2330. More specifically, the spring 2335 may have one end connected to the lock plate 2330 and the other end connected to the plate 2340.

With reference to FIG. 17, the operating principle of the spring 2335 will be described in detail.

As illustrated in FIG. 17(*a*), when the lock plate 2330 is to move upward, the cam 2350 rotates by a driving force of the second motor 2321, while overcoming the elastic force of the spring 2335. As a result, the lock plate 2330 is allowed to move in the upward direction by the rotation of the cam 2350. That is, the driving force provided by the second motor 2321 overcomes the elastic force of the spring 2335.

Further, as illustrated in FIG. 17(*b*), when the lock plate 2330 is to move downward, the spring 2335 pulls the lock plate 2330 downward, and the lock plate 2330 is allowed to move linearly by rotation of the cam 2350.

Figure 18:
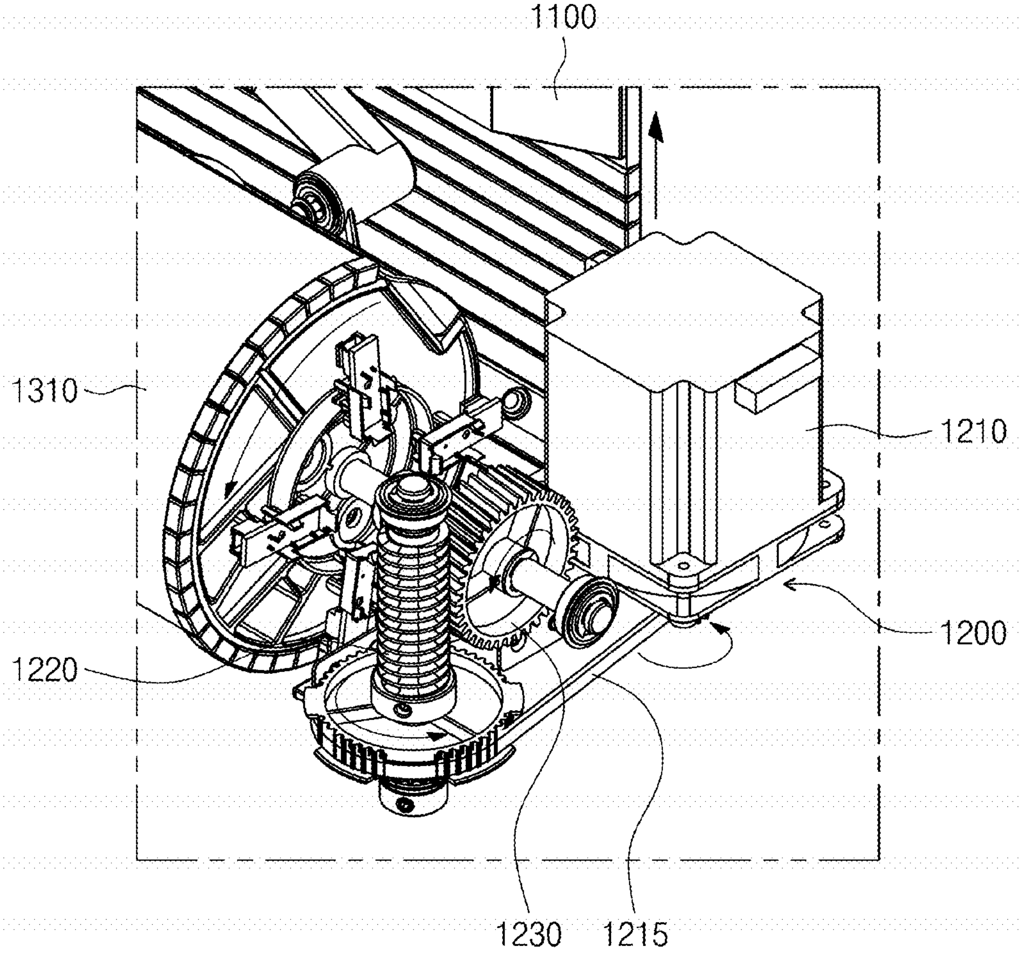
FIG. 18 illustrates a display driver in a display device according to embodiments.

FIG. 18 illustrates a display driver in a display device according to embodiments.

The display driver of FIG. 18 corresponds to the display driver illustrated in FIG. 4.

Referring to FIG. 18, the display driver 1200 may include a first motor 1210, a first timing belt 1215, a worm gear unit 1220, and a worm wheel unit 1230. Further, the display winder 1300 may include a cylindrical rotation drum 1300 that may rotate around a horizontal rotation axis and wind the display 1100 around an outer circumferential surface thereof. The display driver 1200 may move the display 1100. Further, because as the display 1100 moves, the supporter 2200 and the movable plate 2310 also move together, as described with reference to FIG. 6, the supporter 2200 and the movable plate 2310 may also move by the display driver 1200.

The first motor 1210 provides power to move the display winder 1300. The first motor 1210 may be connected to the rotation drum 1310 and rotate the rotation drum 1310. Various gear components may be used to connect the first motor 1210 and the rotation drum 1310.

As illustrated in FIG. 18, the first timing belt 1215 is connected to a rotation axis of the first motor 1210, and the worm gear unit 1220 is connected to the first timing belt 1215, for rotation. The worm wheel unit 1230 rotates in mesh with the worm gear unit 1220, and is connected to the rotation axis of the rotation drum 1310 to transmit the power of the first motor 1210 to the rotation drum 1310. When the rotation drum 1310 rotates by the first motor 1210, the display 1100 is wound around or unwound from the rotation drum 1310 depending on the direction of rotation, thereby controlling an extension range of the display 1100.

The rotation of the first motor 1210 may be controlled by a controller (not shown). For example, the controller (not shown) may control the operation of the first motor 1210 for proper retraction or extension of the display 1100. The display unit 1100 may have a different size of area extended to the outside depending on a mode, and the first motor 1210 may control its operation depending on a mode selected by the user to adjust an exposure range of the display 1100. The first motor 1210 may be a stepping motor or a hybrid motor. The controller (not shown) may represent an integrated controller or head unit of a vehicle. Alternatively, the controller (not shown) may be configured in software, in hardware, as a processor, or in a combination thereof that controls the display device.

The worm gear unit 1220 includes a rod rotating around a rotation axis parallel to the rotation axis of the first motor 1210 and a worm gear connected to the rod. The worm gear unit 1220 may rotate by the rotation of the first motor 1210, and operatively connected to the first motor 1210 by the first timing belt 1215. That is, the first motor 1210 may rotate the rod of the worm gear unit 1220 by the first timing belt 1215.

The worm wheel unit 1230 is connected to the worm gear unit 1220 and includes a worm wheel gear with a rotation axis perpendicular to the rotation axis of the first motor 1210 or the worm gear unit 1220. As illustrated in FIG. 15, the rotation axis of the worm wheel unit 1230 is identical to the rotation axis of the rotation drum 1310. Thus, when the worm wheel unit 1230 rotates by the rotation of the first motor 1210, the rotation drum 1310 rotates.

The material of the worm wheel gear may include polyoxymethylene (POM), and the material of the worm gear may include brass.

Figure 19:
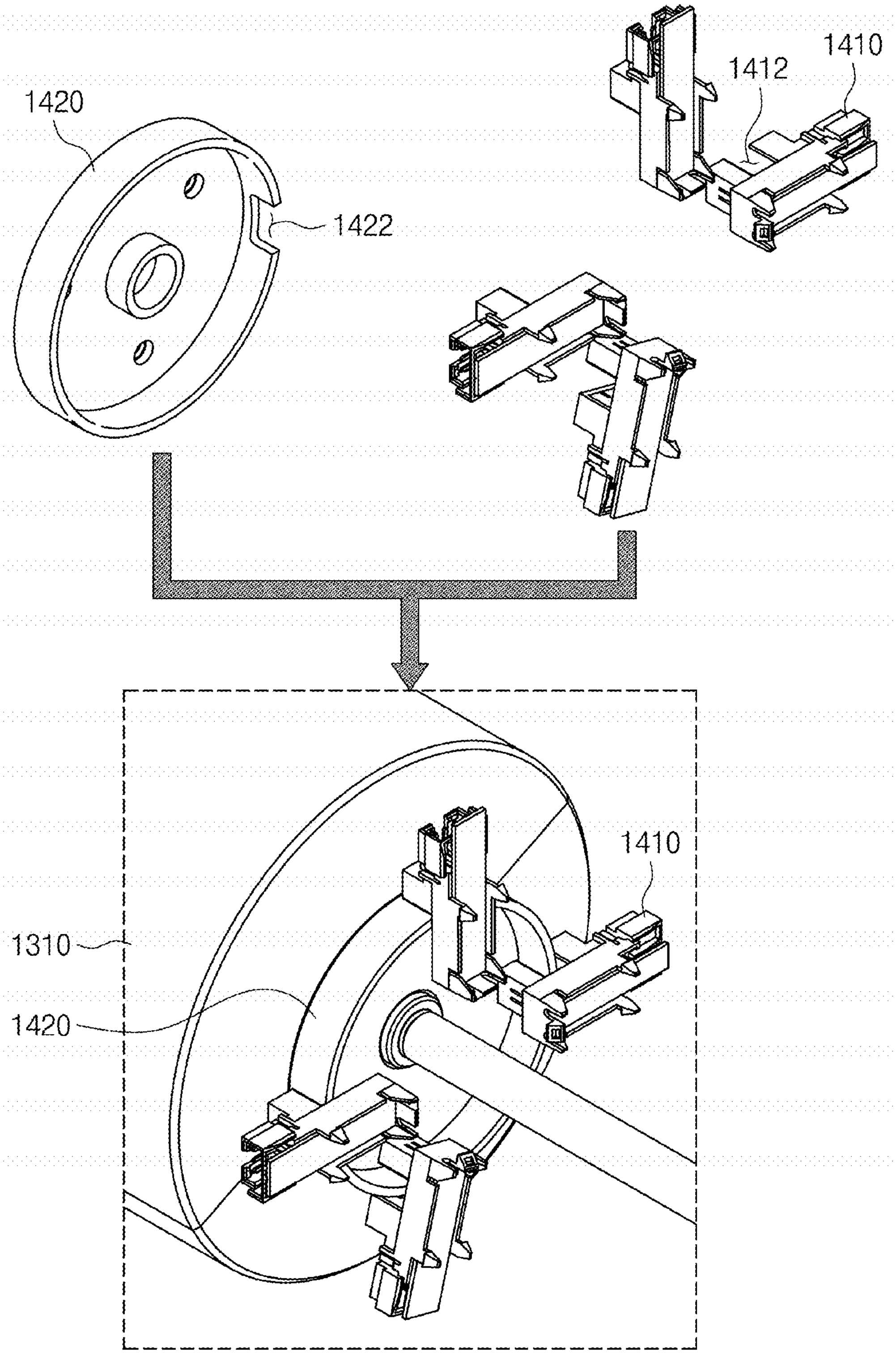
FIG. 19 illustrates the principle of controlling exposure of a display according to rotation of a display winder in a display device according to embodiments.

FIG. 19 illustrates the principle of controlling exposure of a display based on rotation of a display winder in a display device according to embodiments.

The display winder of FIG. 19 corresponds to the display winder of FIGS. 4 and 18.

Referring to FIG. 19, the display unit 1000 may include a plurality of sensors 1410 and a sensed portion 1420 sensed by the plurality of sensors 1410. The sensed portion 1420 may be connected to one side surface of the rotation drum 1310 to rotate together with the rotation drum 1310, and sensed by at least one of the plurality of sensors 1410. The sensors 1410 may be fixed in position to a frame located within a casing. The side surface of the rotation drum 1310 to which the sensed portion 1420 is connected is a surface perpendicular to the rotation axis of the rotation drum 1310.

Depending on rotation states of the rotation drum 1310, the sensing states of the plurality of sensors 1410 may vary, and the operation of the first motor 1210 may be controlled based on the sensing states of the plurality of sensors 1410. In other words, any one of the plurality of sensors 1410 may sense a state different from a state sensed by the other sensors based on a rotation state of the rotation drum 1310, and the operation of the first motor 1210 may be controlled accordingly. Therefore, the display device 100 according to an embodiment may control the extension range of the display 1100 by recognizing the rotation of the display winder 1300 through the plurality of sensors 1410 and the sensed portion 1420.

The plurality of sensors 1410 are fixed at positions where they may sense the rotation of the rotation drum 1310. The plurality of sensors 1410 may be fixed within the casing to sense the sensed portion 1420 connected to the rotation drum 1310. Accordingly, the sensors 1410 are maintained at certain positions without rotating together with the rotation drum 1310.

The sensed portion 1420 rotates in connection to the rotation drum 1310, and the sensed portion 1420 is shaped such that one of the plurality of sensors 1410 senses differently from the other sensors. For example, in the case where the plurality of sensors 1410 include a first sensor 1410*a*, a second sensor 1410*b*, a third sensor 1410*c*, and a fourth sensor 1410*d*, when the first sensor 1410*a* is in an on state by the sensed portion 1420, the second sensor 1410*b* to the fourth sensor 1410*d* are in an off state. On the contrary, the first sensor 1410*a* may be in the off state, while the second sensor 1410*b* to the fourth sensor 1410*d* may be in the on state.

The sensed portion 1420 is connected to one surface of the rotation drum 1310 and includes a hole 1422 that the sensors 1410 may sense.

When the rotation drum 1310 rotates, the position of the hole 1422 also rotates around the rotation axis, and when the hole 1422 pass through a sensing area 1412 of any one of the sensors 1410, the sensor may detect a rotation state of the rotation drum 1310 by sensing the hole 1422. Accordingly, the extension range of the display 1100 may be controlled by mapping rotation states of the rotation drum 1310 to a plurality of modes.

Figure 20:
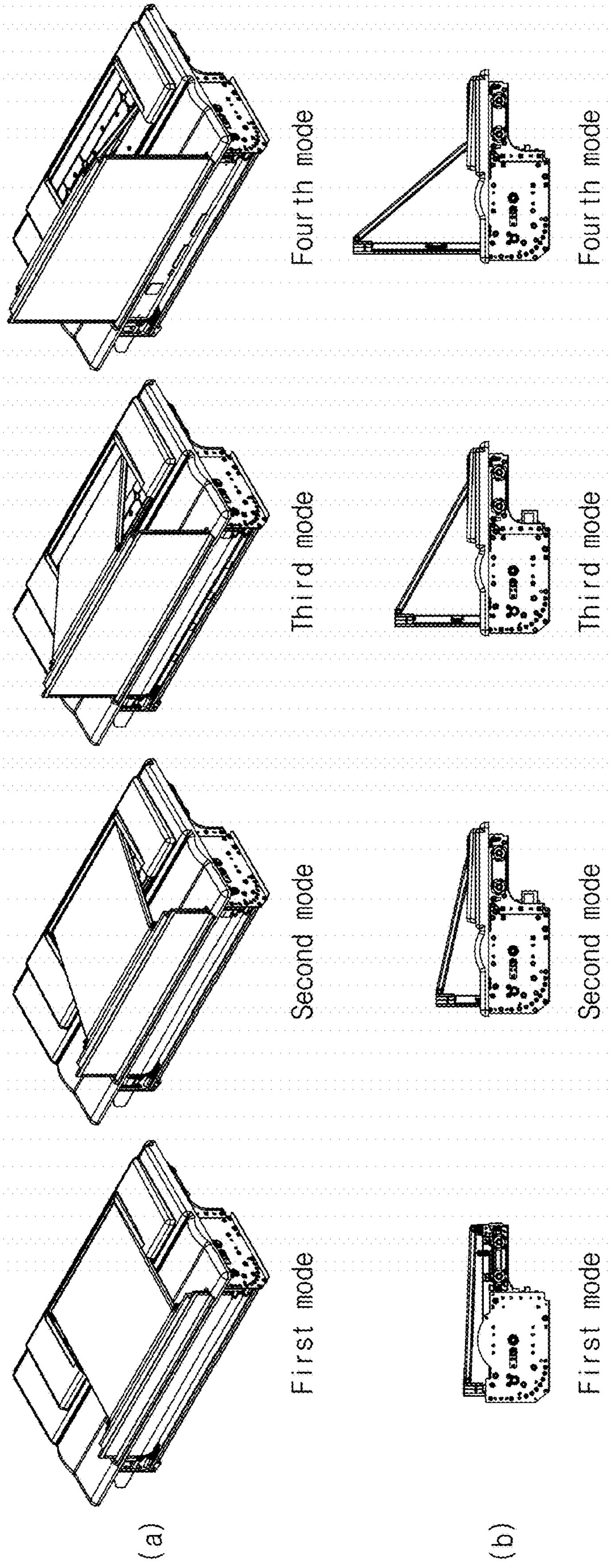
FIG. 20 illustrates modes based on exposure of a display in a display device according to embodiments.

FIG. 20 illustrates modes based on exposure of a display in a display device according to embodiments. More specifically, FIG. 20(*a*) is a perspective view illustrating the display device, and FIG. 20(*b*) is a side view illustrating the display device.

The display device of FIG. 20 corresponds to the display device of FIGS. 2 and 3.

Referring to FIG. 20, four modes differ in the extension range of the display 1100. Although four modes are shown in the drawing, there may be more or fewer modes. The modes may be categorized into four modes including a first mode in which the display 1100 is fully retracted and a fourth mode in which the display 1100 is fully extended. Each mode may be identified by the type and function of information displayed on the display 1100. For example, a third mode may be used for a navigation screen, and the fourth mode may be used for running a video or a game.

In the first mode, the display 1100 is retracted into the casing, with the display 1100 fully wound around the rotation drum 1310.

When one of the second to fourth modes is executed by user selection, the supporter fixture 2300 may first move the lock plate 2330 in the downward direction. Then, when it is determined that the lock plate 2330 has been fully moved in the downward direction, the display driver 1200 may operate the first motor 1210 to rotate the rotation drum 1310 and extend the display 1100 from the housing 2100. As the display 1100 is extended to the outside, the supporter 2200 connected to the display 1100 and the movable plate 2310 connected to the supporter 2200 may also move together.

On the contrary, when the first mode is executed by user selection in one of the second to fourth modes, the supporter fixture 2300 may similarly first move the lock plate 2330 in the downward direction. Then, when it is determined that the lock plate 2330 has been fully moved in the downward direction, the display driver 1200 may operate the first motor 1210 to rotate the rotation drum 1310 and retract the display 1100 into the housing 2100. As the display 1100 is retracted into the housing 2100, the supporter 2200 connected to the display 1100 and the movable plate 2310 connected to the supporter 2200 may also move together.

In other words, when a mode is changed, the supporter fixture 2300 characteristically first moves the lock plate 2330 downward before driving of the display driver 1200.

Further, the display device 100 according to embodiments may further include a controller (not shown).

When a user-desired mode (hereinafter, referred to as a "target mode") is the same as a mode currently running (hereinafter, referred to as a "current mode"), the controller may control to stop retraction/extension of the display 1100, that is, to maintain the display 1100 in its current state. On the contrary, when the target mode is not the same as the current mode, the controller may control the display driver

1200 to operate the first motor 1210 to retract or extend the display 1100. The controller may also control whether to operate the supporter fixture 2300.

For example, when the target mode is the second mode, the controller determines which mode the current mode corresponds to. When the controller determines that the current mode corresponds to the first mode, it may control the supporter fixture 2300 to move the lock plate 2330 in the downward direction before controlling the display driver 1200. When the controller determines that the lock plate 2330 has been fully moved in the downward direction and thus the movable plate 2310 is movable, the controller may control the first motor 1210 to operate in a first direction (e.g., clockwise). Further, when the controller determines that the current mode corresponds to the third mode or the fourth mode, the controller may also control the supporter fixture 2300 to move the lock plate 2330 in the downward direction before controlling the display driver 1200. When the controller determines that the lock plate 2330 has been fully moved in the downward direction and thus the movable plate 2310 is movable, the controller may control the first motor 1210 to rotate in a second direction (e.g., counter-clockwise). Preferably, the second direction is the opposite of the first direction.

For example, when the target mode is the third mode, the controller determines which mode the current mode corresponds to. When the controller determines that the current mode corresponds to the first mode or the second mode, the controller may control the supporter fixture 2300 to move the lock plate 2330 in the downward direction before controlling the display driver 1200. Then, when the controller determines that the lock plate 2330 has been fully moved in the downward direction and thus the movable plate 2310 is movable, the controller may control the first motor 1210 to rotate in the first direction (e.g., clockwise). Alternatively, when the controller determines that the current mode corresponds to the fourth mode, the controller may also control the supporter fixture 2300 to move the lock plate 2330 in the downward direction before controlling the display driver 1200. When the controller determines that the lock plate 2330 has been fully moved in the downward direction and thus the movable plate 2310 is movable, the controller may control the first motor 1210 to rotate in the second direction (e.g., counterclockwise).

For example, when the target mode is the fourth mode, the controller determines which mode the current mode corresponds to. When the controller determines that the current mode corresponds to the first mode, the second mode, or the third mode, the controller may control the supporter fixture 2300 to move the lock plate 2330 in the downward direction before controlling the display driver 1200. Then, when the control determines that the lock plate 2330 has been fully moved in the downward direction and thus the movable plate 2310 is movable, the controller may control the first motor 1210 to rotate in the first direction (e.g., clockwise).

Further, when the target mode is the first mode, the controller determines which mode the current mode corresponds to. When the controller determines that the current mode corresponds to the second, third, or fourth mode, the controller may control the supporter fixture 2300 to move the lock plate 2330 in the downward direction before controlling the display driver 1200. Then, when the control determines that lock plate 2330 has been fully moved in the downward direction and thus the movable plate 2310 is movable, the controller may control the first motor 1210 to rotate in the second direction (e.g., counterclockwise).

When the controller determines that the target mode has been reached in any case, the controller may control the supporter fixture 2300 to move the lock plate 2330 in the upward direction. This offers the effect of locking the movable plate 2310 to the fixed plate 2330, thereby preventing movement of the supporter 2200, while ensuring that the display 1100 is not easily broken by external forces.

More specifically, as described with reference to FIGS. 10 and 11, as the lock plate 2330 moves in the upward direction, the block member 2312 formed on the bottom end portion of the movable plate 2310 is accommodated in the concave groove 2332 formed on the lock plate 2330, thereby locking the movable plate 2310 to the lock plate 2330.

Referring to FIG. 11(*a*) together, for example, when the target mode is the second mode, the block member 2312 may be located in a first concave groove 2332*a*, thereby locking the movable plate 2310 to the lock plate 2330. Alternatively, for example, when the target mode is the third mode, the block member 2312 may be located in a second concave groove 2332*b*, thereby locking the movable plate 2310 to the lock plate 2330. Alternatively, for example, when the target mode is the fourth mode, the block member 2312 may be located in a third concave groove 2332*c*, thereby locking the movable plate 2310 to the lock plate 2330. Accordingly, a spacing between the concave grooves 2332 may be determined in proportion to a range in which the display 1100 is retracted.

According to any one of embodiments of the disclosure, the utilization of the internal space of a vehicle is increased by reducing an accommodation space for a display.

Furthermore, according to any one of embodiments of the disclosure, the utilization of the display is increased by adjusting the degree of exposure of the display, and power may be saved by using power only for an exposed portion of a display area.

Furthermore, according to any one of the embodiments of the disclosure, a flexible display may be retracted or extended from the accommodation space, while being protected safely.

As described above, a detailed description of preferred embodiments of the disclosure has been given to enable those skilled in the art to implement and practice the disclosure. While the above description has been made with reference to the preferred embodiments of the disclosure, it will be understood by those skilled in the art that various modifications and changes may be made to the disclosure without departing from the scope of the disclosure. For example, those skilled in the art may use the configurations described in the above-described embodiments in combination with each other.

Accordingly, the embodiments as set forth herein are not intended to limit the disclosure, but rather to give the broadest possible scope consistent with the principles and novel features disclosed herein.

What is claimed is:

1. A display device comprising:

a display driver configured for moving a display;

a display winder operatively engaged to the display driver and configured for winding and unwinding the display according to the movement of the display; and a display support unit supporting the display, wherein the display support unit includes:

a housing having an opening formed therein to allow the display to be retracted and extended through the opening;

a supporter having a top end hinged to a top end portion of the display and supporting the display; and a supporter fixture fixing the supporter, wherein the supporter fixture includes:

a first motor configured for providing a driving force;

a shaft engaged to the first motor for receiving the driving force and being a rotation axis; and a cam eccentrically fixed to the shaft, receiving the driving force, and rotatable by the driving force of the first motor.

2. The display device of claim 1, wherein the top end of the supporter is connected to a rear top end portion of the display, and a bottom end portion of the supporter is connected to the supporter fixture.

3. The display device of claim 1, wherein the supporter fixture includes:

a movable plate hinged to a bottom end of the supporter and sliding together with the supporter;

a lock plate located under the movable plate; and wherein the lock plate is movable upward and downward by rotation of the cam.

4. The display device of claim 3, wherein the supporter fixture further includes:

a sensed portion fixed to one side of the shaft to rotate together with the shaft, and having a rotation axis identical to the rotation axis of the shaft; and a sensor including a light emitter emitting light and a light receiver receiving the light, wherein the sensed portion includes a single hole sensible by the sensor, and wherein on and off of the sensor are determined according to whether the light is blocked by the sensed portion.

5. The display device of claim 3, wherein the cam has a rotation axis identical to the rotation axis of the shaft, wherein the cam includes a first surface formed in a straight line and a second surface formed in a curve with a decreasing curvature, and wherein the rotation axis of the cam is formed at a position where the first surface and the second surface meet.

6. The display device of claim 3, wherein the movable plate includes a block member on a bottom end portion of the movable plate, and wherein the lock plate includes at least one concave groove at a top end portion thereof to selectively accommodate the block member.

7. The display device of claim 6, wherein the at least one concave groove is in plural, and wherein a spacing between the concave grooves is determined in proportion to a range in which the display is retracted.

8. The display device of claim 3, wherein the supporter fixture further includes:

a first stopper preventing sliding of the movable plate beyond an operating range of the movable plate; and a second stopper preventing upward and downward movements of the lock plate beyond an operating range of the lock plate.

9. The display device of claim 8, wherein the supporter fixture further includes a through hole, and the second stopper connected to the lock plate moves inside the through hole, wherein the second stopper is selectively connected to one of a first end or a second end of the through hole depending on the movement of the lock plate.

10. The display device of claim 3, wherein the supporter fixture further includes a spring providing an elastic force in a movement direction of the lock plate.

11. The display device of claim 1, wherein the display driver includes:

a second motor configured for providing a driving force;

a worm gear unit connected to the second motor and having a rotation axis parallel to the second motor; and a worm wheel unit connected to the worm gear unit and having a rotation axis perpendicular to the second motor, wherein the display winder includes a cylindrical rotation drum rotating around a horizontal rotation axis and capable of winding the display around an outer circumferential surface thereof, and wherein the rotation axis of the worm wheel unit is identical to the rotation axis of the rotation drum to move the display by rotation of the second motor.

12. A vehicle comprising:

a vehicle body; and the display device of the claim 1, provided in the vehicle body.

13. The vehicle of claim 12, wherein the housing is an instrument panel (IP) of the vehicle body.

14. A vehicle comprising:

a vehicle body; and a display device provided in the vehicle body, wherein the display device includes:

a display driver configured for moving a display engaged to the display driver;

a display winder operatively engaged to the display driver and configured for winding and unwinding the display according to the movement of the display; and a display support unit supporting the display, wherein the display support unit includes:

a housing having an opening formed therein to allow the display to be retracted and extended through the opening;

a supporter having a top end hinged to a top end portion of the display and supporting the display; and a supporter fixture fixing the supporter, wherein the supporter fixture includes:

a motor configured for providing a driving force;

a shaft engaged to the motor for receiving the driving force and being a rotation axis; and a cam eccentrically fixed to the shaft, receiving the driving force, and rotatable by the driving force of the motor.

15. The vehicle of claim 14, wherein the housing is an instrument panel (IP) of the vehicle body.

* * * * *